United States Patent
Sato

(10) Patent No.: US 6,952,867 B2
(45) Date of Patent: Oct. 11, 2005

(54) METHOD FOR MANUFACTURING PERPENDICULAR MAGNETIC RECORDING HEAD HAVING INVERTED TRAPEZOIDAL MAIN MAGNETIC POLE LAYER

(75) Inventor: Kiyoshi Sato, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 538 days.

(21) Appl. No.: 10/025,040

(22) Filed: Dec. 18, 2001

(65) Prior Publication Data

US 2002/0078553 A1 Jun. 27, 2002

(30) Foreign Application Priority Data

Dec. 26, 2000 (JP) .................................... 2000-394663

(51) Int. Cl.[7] .......................... G11B 5/127; H04R 31/00
(52) U.S. Cl. ............................ 29/603.15; 29/603.07; 29/603.13; 29/603.14; 29/603.16; 29/603.18; 205/112; 205/119; 216/39; 216/41; 360/122; 360/123; 360/124; 360/125; 360/126; 360/317; 451/5; 451/41
(58) Field of Search ............ 29/603.07, 603.13–603.16, 29/603.18; 360/122–126, 317; 216/39, 41; 451/5, 41; 205/119, 112

(56) References Cited

U.S. PATENT DOCUMENTS

| | | | |
|---|---|---|---|
| 4,546,398 A | 10/1985 | Toda et al. ................. 360/126 |
| 4,636,897 A | 1/1987 | Nakamura et al. .......... 360/119 |
| 4,873,599 A | 10/1989 | Sueoka ....................... 360/126 |
| 5,225,953 A | * 7/1993 | Wada et al. ................. 360/126 |
| 6,385,008 B1 | * 5/2002 | Santini et al. .............. 360/126 |

FOREIGN PATENT DOCUMENTS

| | | | |
|---|---|---|---|
| JP | 54-032985 | 3/1979 | |
| JP | 57-050436 | 3/1982 | |
| JP | 01037703 A | * 2/1989 | .......... G11B/5/127 |
| JP | 8-106613 | 4/1996 | |
| JP | 10-320720 | 12/1998 | |
| JP | 2000-339626 | 12/2000 | |

OTHER PUBLICATIONS

"Interaction between head and recording medium in perpendicular recording"; Hokkyo, J.; Saito, I.; Satake, S.; Magnetics, IEEE Transactions on, vol.: 16, Issue: 5, Sep. 1980; pp.:887–889.*

Copy of Office Action dated Aug. 10, 2004 for Japanese Patent Application No. 2000-394663.

* cited by examiner

*Primary Examiner*—Paul D Kim
(74) *Attorney, Agent, or Firm*—Brinks Hofer Gilson & Lione

(57) ABSTRACT

The side edge of the main magnetic pole layer is prevented from protruding in the track width direction even when a skew angle is generated by forming the main magnetic pole layer of the opposing face opposing the recording medium as an inverted trapezoid, thereby enabling the occurrence of side fringing to be prevented.

12 Claims, 22 Drawing Sheets

METHOD FOR MANUFACTURING PERPENDICULAR MAGNETIC RECORDING HEAD HAVING INVERTED TRAPEZOIDAL MAIN MAGNETIC POLE LAYER

BACKGROUND OF THE INVENTION

1. Field of the Invention

The present invention relates to a perpendicular magnetic recording head for recording on a magnetic recording medium such as, for example, a disk having a rigid film by applying a perpendicular magnetic field. More specifically, the object of the present invention is to provide a perpendicular magnetic recording head compatible with high density recording by suppressing the occurrence of fringing of recording patterns, and a method for manufacturing the magnetic recording head.

2. Description of the Related Art

A device for high density recording of magnetic data on a recording medium such as a disk has utilized a perpendicular magnetic recording method. FIG. 41 is a cross-sectional view showing the general structure of a perpendicular magnetic recording head to be used in the perpendicular magnetic recording method described above.

The perpendicular magnetic recording head H used in the perpendicular magnetic recording method is provided at a trailing side end face 1a of a slider 1 that travels by floating or sliding on a recording medium. For example, the perpendicular magnetic recording head H is disposed between a non-magnetic film 2 and a non-magnetic coating film 3 at the trailing side end face 1a of the slider 1.

The perpendicular magnetic recording head H is composed of an auxiliary magnetic pole layer 4 made of a ferromagnetic material and a main magnetic pole layer 5, which is formed on the auxiliary magnetic pole layer 4, is separated therefrom by a space, and is made of the same ferromagnetic material, and an end face 4a of the auxiliary magnetic pole layer 4 and an end face 5a of the main magnetic pole layer 5 are exposed at an opposing face Ha opposing a recording medium Md. The auxiliary magnetic pole layer 4 and the main magnetic pole layer 5 are magnetically coupled with each other at a magnetic coupling part 6 located behind the opposing face Ha.

A non-magnetic insulation layer 7 made of an inorganic material such as $Al_2O_3$ or $SiO_2$ is located between the auxiliary magnetic pole layer 4 and the main magnetic pole layer 5. An end face 7a of this non-magnetic insulation layer 7 is exposed at the opposing face Ha between the end face 4a of the auxiliary magnetic pole layer 4 and the end face 5a of the main magnetic pole layer 5.

Coil layers 8 made of a conductive material such as Cu are embedded in the non-magnetic insulation layer 7.

The thickness hw of the end face 5a of the main magnetic pole layer 5 is made to be smaller than the thickness hr of the end face 4a of the auxiliary magnetic pole layer 4, as shown in FIG. 41. The width of the end face 5a of the main magnetic pole layer 5 in the track width direction (the X-direction) corresponds to the track width, and this width is also made to be sufficiently smaller than the width of the end face 4a of the auxiliary magnetic pole layer 4 in the track width direction.

The recording medium Md for magnetic recording with the perpendicular magnetic recording head H moves in the Z-direction relative to the perpendicular magnetic recording head H, and a rigid film Ma and a soft film Mb are provided on the surface and inside of the recording medium, respectively.

A leakage recording magnetic field vertically passes through the rigid film Ma of the recording medium Md to the soft film Mb between the end face 4a of the auxiliary magnetic pole layer 4 and the end face 5a of the main magnetic pole layer 5 when a recording magnetic field is induced in the auxiliary magnetic pole layer 4 and main magnetic pole layer 5 by causing an electric current to flow in the coil layer 8. Since the area of the end face 5a of the main magnetic pole layer 5 is sufficiently narrower than the area of the end face 4a of the auxiliary magnetic pole layer 4, the magnetic flux ϕ converges on the portion opposed to the end face 5a of the main magnetic pole layer 5, thereby recording magnetic data on the rigid film Ma at the portion opposed to the end face 5a.

FIG. 42 is a fragmentary front view of the perpendicular magnetic recording head shown in FIG. 41 viewed from the opposing face side opposing the recording medium. The main magnetic pole layer 5 of the perpendicular magnetic recording head shown in FIGS. 41 and 42 is plated on a plating underlayer 5b using a magnetic material. The main magnetic pole layer 5 formed by deposition has a curved convex surface 5c. The side faces 5d and 5d of the main magnetic pole layer 5 are perpendicular to the track width direction (the X-direction in the drawing) in the conventional perpendicular magnetic recording head.

FIG. 43 shows a plan view of a recording track on the recording medium on which signals are recorded by the perpendicular magnetic recording head shown in FIGS. 41 and 42.

A skew angle may be formed by allowing the side faces 5d of the main magnetic pole layer 5 to be inclined against the tangent of the rotational direction (Z-direction) of the recording medium Md when the slider 1 moves from the inner circumference to the outer circumference of the disk-shaped recording medium Md. If the side faces 5d of the main pole layer 5 are assumed to be perpendicular to the track width direction, as shown in FIG. 42, then the side faces 5d of the main magnetic pole layer impart an inclined magnetic field outside the track width Tw1, as shown by broken lines, to generate fringing F when the side faces 5d of the main magnetic pole layer 5 are inclined against the tangent of the direction of travel (the Z-direction) of the recording medium, thereby causing decrease in off-track performance.

The magnetic domain boundary B1 is curved when the surface 5c of the main magnetic pole layer 5 forms a curved convex face. As a result, the pulse width of the reproduced waveform is increased, and a clear distribution of the recording magnetic field cannot be obtained for high density recording. Consequently, it becomes difficult to improve the recording density in the longitudinal direction of the recording track (the A-direction in the drawing).

SUMMARY OF THE INVENTION

Accordingly, it is an object of the present invention to solve the problems as hitherto described by providing a method for manufacturing a perpendicular magnetic recording head which can suppress the occurrence of fringing on the recording pattern while improving the off-track performance, and which can improve the recording density in the longitudinal direction of the recording track (A-direction).

The present invention provides a method for manufacturing a perpendicular magnetic recording head comprising the steps of (a) forming an auxiliary magnetic pole layer using a magnetic material, (b) forming a coupling layer with a magnetic material on the auxiliary magnetic pole layer behind a face that serves as an opposing face opposing a recording medium, (c) forming a coil layer in the region behind the face that serves as an opposing face opposing the recording medium, (d) laminating an insulation layer on the auxiliary magnetic pole layer, (e) forming an inorganic insulation layer having a main magnetic pole forming groove on the insulation layer, the inner width of the groove in a track width direction gradually increasing in accordance with the distance from the auxiliary magnetic pole layer on the opposing face portion, and the main magnetic pole forming groove having a given depth from the opposing face to the back of the opposing face, (f) forming a main magnetic pole layer in the main magnetic pole forming groove; and (g) magnetically coupling the main magnetic pole layer and the coupling layer directly or by forming yoke layers on the main magnetic pole layer and coupling layer.

The present invention provides a method for manufacturing a perpendicular magnetic recording head in which an auxiliary magnetic pole layer and main magnetic pole layer are disposed on an opposing face opposing a recording medium with a distance apart, and a coil layer for imparting a recording magnetic field to the auxiliary magnetic pole layer and main magnetic pole layer is provided behind the opposing face. In the perpendicular magnetic recording head obtained, a magnetic field applied in a perpendicular direction to the plane of the recording medium is converged on the recording medium on which magnetic data are record.

In the method for manufacturing the perpendicular magnetic recording head according to the present invention, a groove may be formed on the inorganic insulation medium in the step (e), and the main magnetic pole layer may be formed in the groove in the step (f). The inner width of the groove in the track width direction gradually increases in accordance with the distance from the auxiliary magnetic pole layer, and the groove has a given depth from the opposing face to the back of the opposing face.

The main magnetic pole layer of the perpendicular magnetic recording head obtained is formed to have an upper edge (the edge at the trailing side) wider than the auxiliary magnetic pole side edge of the main magnetic pole layer, so that the inner width of the groove in the track width direction gradually increases in accordance with the distance from the auxiliary magnetic pole layer on the opposing face. In other words, the front face of the main magnetic pole layer is formed to be a inverted trapezoidal shape on the opposing face.

The inverted trapezoidal shape of the front face of the main magnetic pole layer on the opposing face permits the edge to be prevented from protruding out of the recording track even when the edge of the main magnetic pole layer forms a skew angle to the tangent of the travel direction of the recording medium during recording on the recording medium, thereby preventing fringing from appearing to improve off-track performance.

Preferably, a lift-off resist layer is laminated on the insulation layer. The inorganic insulation layer is deposited deep into a cut portion formed on the lower face of the resist layer using the lift-off resist layer as a mask from a perpendicular direction to the surface of the insulation layer or from a direction inclined with a given angle relative to the perpendicular direction, and an inorganic insulation layer having the main magnetic pole forming groove is formed by removing the resist layer in the step (e) according to the present invention. The inner width of the groove in the track width direction gradually increases in accordance with the distance from the auxiliary magnetic pole layer, and the groove has a given depth from the opposing face to the back of the opposing face.

Preferably, an inorganic insulation layer is sequentially deposited on the insulation layer, a resist layer having an etching groove with side faces inclined against the track width direction is formed on the inorganic insulation layer by heat-treating the resist layer or by adjusting the pattern forming accuracy of the groove after forming the resist layer having a patterned groove, and the main magnetic pole layer forming groove is formed on the inorganic insulation layer by engraving the inorganic insulation layer by etching using the resist layer as a mask in the step (e) according to the present invention. The inner width of the groove in the track width direction gradually increases in accordance with the distance from the auxiliary magnetic pole layer, and the groove has a given depth from the opposing face to the back of the opposing face.

Alternatively, an inorganic insulation layer may be sequentially deposited on the insulation layer, and the main magnetic pole forming grove is formed on the inorganic insulation layer by engraving the inorganic insulation layer by etching using the resist layer as a mask after forming it on the inorganic insulation layer in the step (e) according to the present invention. The resist layer has a patterned etching groove with side faces that are perpendicular to or inclined relative to the track width direction, the inner width of the groove in the track width direction gradually increases in accordance with the distance from the auxiliary magnetic pole layer, and the groove has a given depth from the opposing face to the back of the opposing face.

The main magnetic pole layer may be formed by a film deposition process such as sputtering or vacuum deposition in the step (f) according to the present invention.

It is preferable for forming the main magnetic pole layer by a film deposition process such as sputtering and vacuum deposition that the surface areas of the main magnetic pole layer and inorganic insulation layer are masked by a resist layer except the main magnetic pole forming groove after forming the main magnetic pole forming groove, and a magnetic material is embedded in the main magnetic pole forming groove by the film deposition process followed by removing the resist layer.

The inorganic insulation layer may be deposited on the insulation layer via a plating underlayer, and the main magnetic pole forming groove is formed so as to expose the plating underlayer in the step (e). The main magnetic pole layer may be plated in the step (f).

It is preferable that the surface of the main magnetic pole layer is planarized, between the steps (f) and (g), by milling by which milling particles are projected from a direction inclined by a given angle relative to the center line of the main magnetic pole layer in the step (h), for forming the main magnetic pole layer by plating.

Planarizing the surface of the main magnetic pole layer permits the upper edge of the main magnetic pole layer to be a straight line on the opposing face.

The magnetic recording medium travels in the direction from the auxiliary magnetic pole side of the magnetic recording head toward the yoke layer side. Accordingly, the shape of the magnetic domain boundary of the recording track on the recording medium is determined by the shape of the upper edge of the main magnetic pole layer.

The magnetic domain boundaries of the recording track also become straight lines when the upper edge of the main magnetic pole layer is a straight line. Consequently, a clear distribution of magnetization may be attained even by increasing the recording density in the longitudinal direction of the recording track, thereby enabling good recording and regeneration characteristics to be obtained.

The given angle is preferably adjusted at 35° or more and 80° C. or less, more preferably at 40° or more and 50° or less in the step (h).

Preferably, the plating underlayer is formed using a non-magnetic material in the step (e).

The plating underlayer may be removed, at the same time of or after the step (h), by milling except the lower layer of the inorganic insulation layer on which the main magnetic pole forming groove has been formed in the step (i). Milling particles are projected from a direction inclined by a given angle relative to the center line of the main magnetic pole layer.

Although the plating underlayer remains on the area except for the area overlapping the main magnetic pole layer, the remaining underlayer does not largely affect the recording characteristics of the perpendicular magnetic recording head when the plating underlayer is made of a nonmagnetic material.

DESCRIPTION OF THE PREFERRED EMBODIMENTS

Figure 1:
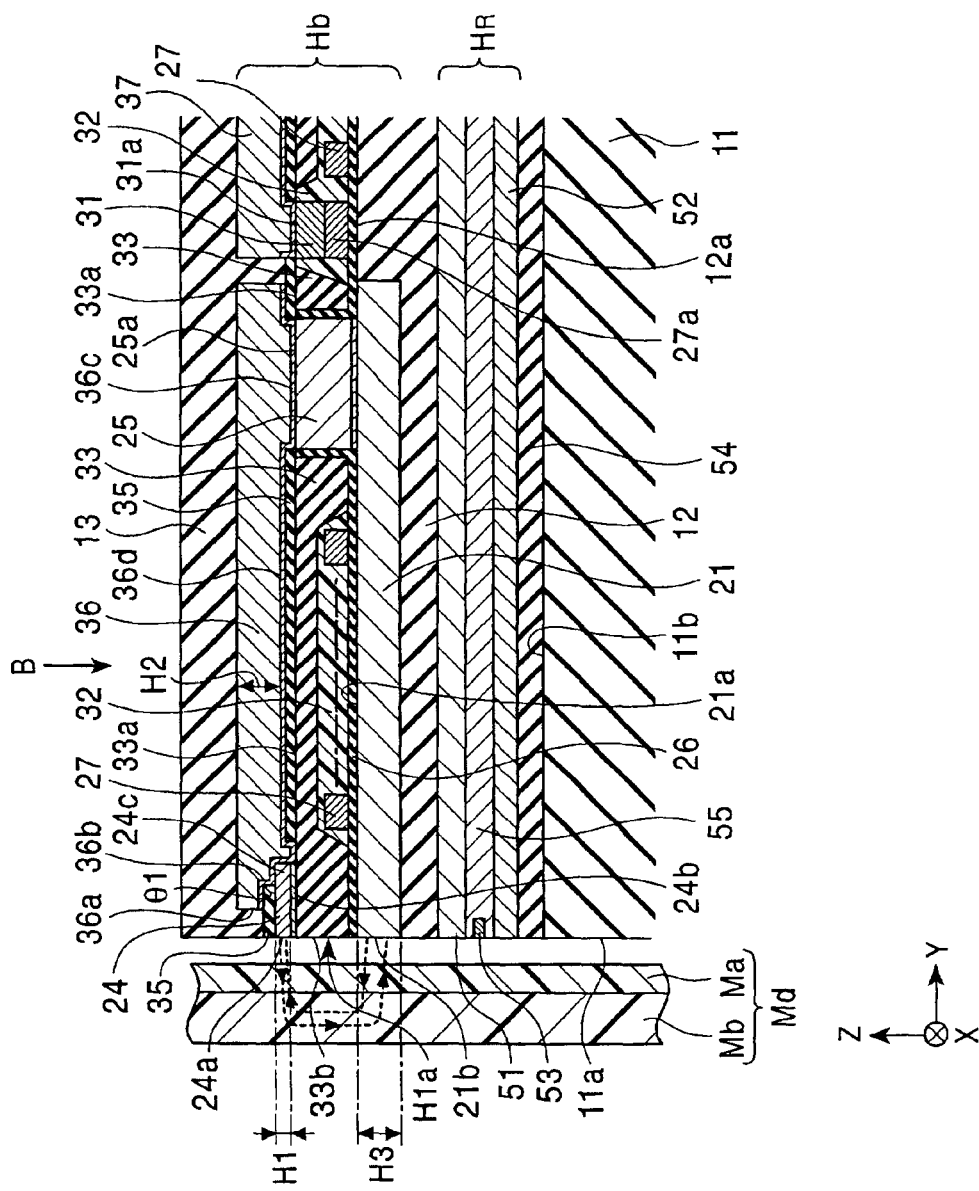
FIG. 1 shows a cross-sectional view of the perpendicular magnetic recording head, manufactured by the method according to one embodiment of the present invention, facing the recording medium.
Figure 2:
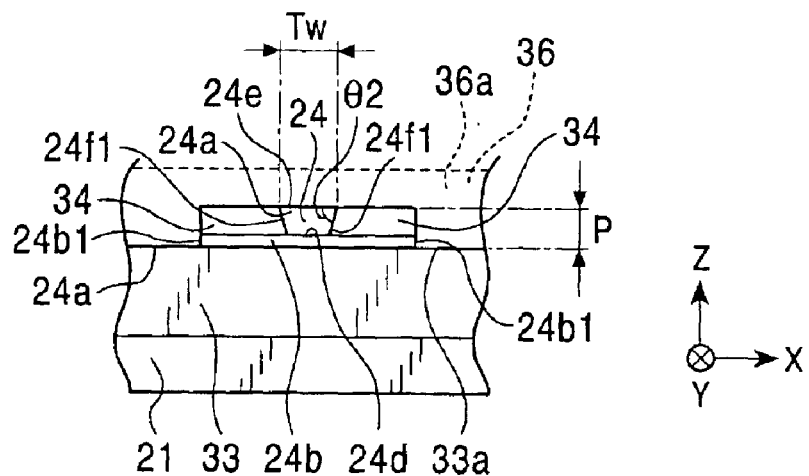
FIG. 2 shows a front view of the perpendicular magnetic recording head viewed from the opposing face opposing the recording medium.

FIG. 1 shows a cross-sectional view of the perpendicular magnetic recording head manufactured by the method according to one embodiment of the present invention, facing the recording medium, and FIG. 2 shows a fragmentary front view of the perpendicular magnetic recording head viewed from the opposing face opposing the recording medium.

The perpendicular magnetic recording head Hb shown in FIG. 1 imparts a perpendicular magnetic field to the recording medium Md to magnetize the rigid film Ma of the recording medium Md in the perpendicular direction.

The recording medium Md is a disk, and a rigid film Ma having high remnant magnetization and a soft film Mb having high magnetic permeability are provided on the surface and within the recording medium, respectively. The disk rotates around the center of the disk as a rotation axis.

A slider 11 of the perpendicular magnetic recording head Hb is made of a nonmagnetic material such as $Al_2O_3$ or TiC. The slider 11 floats on the surface of the recording medium Md by an air stream on the surface when the recording medium Md rotates while the opposing face 11a of the slider 11 faces the recording medium Md to cause the slider 11 to slide on the recording medium Md. The perpendicular magnetic recording head is provided at the trailing side end face 11b. The direction of travel of the recording medium Md facing the slider 11 is in the Z-direction in FIG. 1.

A nonmagnetic layer 54 made of an inorganic material such as $Al_2O_3$ or $SiO_2$ is formed at the trailing side end face 11b of the slider 11, a read part $H_R$ is formed on the nonmagnetic layer 54.

The read part $H_R$ is composed of a lower shield layer 52, a gap layer 55, a magnetoresistive element 53, and an upper shield layer 51 from the bottom to the top. Examples of the magnetoresistive element 53 include an anisotropic magnetoresistive (AMR) element, a giant magnetoresistive (GMR) element, and a tunnel magnetoresistive (TMR) element.

A nonmagnetic insulation layer 12 made of an inorganic material such as $Al_2O_3$ or $SiO_2$ is formed on the upper shield layer 51, and the perpendicular magnetic recording head Hb according to the present invention is provided on the nonmagnetic insulation layer 12 for recording. The perpendicular magnetic recording head Hb is coated with a protective layer 13 made of an inorganic nonmagnetic insulating material. The opposing face H1a of the recording medium of the perpendicular magnetic recording head Hb is located at the same level as the opposing face 11a of the slider 11.

An auxiliary magnetic pole layer 21 plated with a ferromagnetic material such as permalloy (a Ni—Fe alloy) is formed on the perpendicular magnetic recording head Hb. The auxiliary magnetic pole layer 21 is a so-called return-pass layer. The nonmagnetic insulation layer 12 is formed under the auxiliary magnetic pole layer 21 (between the auxiliary magnetic pole layer 21 and upper shield layer 51) and around the auxiliary magnetic pole layer 21. The surface 21a of the auxiliary magnetic pole layer 21 lies in the same plane as the surface 12a of the nonmagnetic insulation layer 12, as shown in FIG. 1.

A coupling layer 25 made of a Ni—Fe alloy is formed on the surface 21a of the auxiliary magnetic pole layer 21 at a location behind the opposing face H1a (the height direction or X-direction).

A nonmagnetic insulation layer 26 made of $Al_2O_3$ is formed on the surface 21a of the auxiliary magnetic pole layer 21 and on the surface 12a of the nonmagnetic insulation layer 12 around the coupling layer 25, and a coil layer 27 is formed with a conductive material such as Cu on the nonmagnetic insulation layer 26. The coil layer 27 is formed by a frame plating method, and is formed in a helical pattern around the coupling layer 25 with a given number of turns. A push-up layer 31 also made of a conductive material such as Cu is formed on the connection end 27a of the coil layer 27.

The coil layer 27 and the push-up layer 31 are covered with an insulation layer 32 of an organic material such as a resist material, and an insulation layer 33 is further coated thereon.

The insulation layer 33 is preferably formed of an inorganic insulating material, which may be selected from at least one of AlO, Al$_2$O$_3$, SiO$_2$, Ta$_2$O$_5$, TiO, AlN, AlSiN, TiN, SiN, Si$_3$N$_4$, NiO, WO, WO$_3$ BN, CrN, and SiON.

The surface 25a of the coupling layer 25, the surface 31a of the push-up layer 31, and the surface 33a of the insulation layer 33 are processed to be located in the same plane as each other. Such planarization processing is carried out using CMP technology, as will be described in the manufacturing method hereinafter.

The main magnetic pole layer 24 made of a NiFe alloy is formed on the insulation layer 33 in the first embodiment, and the front face 24a of the main magnetic pole layer 24 is located in the same plane as the opposing face H1a. The main magnetic pole layer 24 is plated on the plating underlayer 24b made of a nonmagnetic material.

A yoke layer 36 made of a NiFe alloy is formed on the insulation layer 33 via the inorganic insulation layer 35. The yoke layer 36 is formed on the plating underlayer 36d made of the NiFe alloy. The rear side 24c of the main magnetic pole layer 24 is magnetically coupled with the tip region 36b of the yoke layer 36, and the rear region 36c of the yoke layer 36 is magnetically coupled with the surface 25a of the coupling layer 25.

The main magnetic pole layer 24 may be extended towards the rear of the opposing face H1a in the height direction, the rear part 24c of the main magnetic pole layer 24 may be magnetically coupled with the surface 25a of the coupling layer 25, and the yoke layer 36 may be formed on the upper layer of the main magnetic pole layer 24.

The front face 36a of the yoke layer 36 is located behind the opposing face H1a and, and is not exposed at the opposing face H1a since it is embedded in the protective layer 13.

The yoke layer 36 is formed to have a larger film thickness H2 than the film thickness H1 of the main magnetic pole layer H1 in this embodiment.

The front face 36a of the yoke layer 36 is perpendicular to the height direction (Y-direction). However, the front face 36a of the yoke layer 36 may be formed as an inclined face inclined in the height direction from the lower face to the surface, or may be formed as a curved face. The exterior angle θ1 between the surface of the main magnetic pole layer 24 formed under the yoke layer 36 and the front face 36a of the yoke layer 36 is preferably 90° or more. This angle permits the leakage magnetic field from the main magnetic pole layer 24 toward the yoke layer 36 to be reduced to enable the magnetic field to preferentially converge on the main magnetic pole layer 24.

A lead layer 37 is formed on the surface 31a of the push-up layer 31, as shown in FIG. 1, thereby allowing a recording current to flow from the lead layer 37 to the push-up layer 31 and the coil layer 27. The lead layer 37 may be formed of the same material as the yoke layer 36, and the yoke layer 36 may be formed at the same time as the lead layer 37. The yoke layer 36 and the lead layer 37 are covered with the protective layer 13 made of Al$_2$O$_3$.

The upper edge (the trailing side edge) 24e of the main magnetic pole 24 is formed to be wider than the side edge 24d at the auxiliary magnetic pole 21 side of the main magnetic pole as shown in FIG. 2, so that the main magnetic pole 24 exposed at the opposing face H1a has an inner width in the track width direction (X-direction) that gradually increases in accordance with the distance from the auxiliary magnetic pole layer 21. In other words, the front shape of the main magnetic pole 24 is a inverted trapezoidal shape on the opposing face H1a. While the side edges 24f1 and 24f1 of the main magnetic pole 24 are straight lines, as shown in FIG. 2, they may be curved:

The periphery of the main magnetic pole 24 is covered with the inorganic insulation layer 34 and protective layer 13.

The track width Tw of the perpendicular magnetic recording head shown in FIGS. 1 and 2 is restricted by the inner width of the upper edge 24e. The track width Tw may be adjusted to be 0.5 μm or more and 0.3 μm or less. The pole length P, as the sum of the elevation of the plating underlayer 24b and the elevation of the main magnetic pole layer 24, is 0.2 to 0.45 μm. The plating underlayer 24b has a thickness of 15 to 50 μm.

The plating underlayer 24b is formed using a nonmagnetic material such as Cu, Au, Pd, Rh, Ru, Pt, NiLu, NiPt, NiPd, NiW, NiB, NiMo, Ir, NiCu, NiCr, Cr or Ti. The recording track pattern on the recording medium may be disturbed when the width in the track width direction at the bottom face of the main magnetic pole layer (the inner width of the side edge 24d at the auxiliary magnetic pole layer 21 side of the main magnetic pole layer 24) is larger than the inner width of the plating underlayer 24b (the width in the track width direction). However, such a disturbance may be prevented by forming the plating underlayer 24b using the nonmagnetic material, as shown, for example, in FIG. 2, without forming the side edges 24f1 and 24f1 of the main magnetic pole layer 24 and the side edges 24b1 and 24b1 of the main magnetic pole layer 24b as continuous flat shapes or curved shapes.

The plating underlayer 24b may be omitted when the main magnetic pole layer 24 is formed by a film deposition process such as sputtering, as will be described hereinafter.

The upper edge 24e of the main magnetic pole layer 24 is formed as a straight line on the opposing face H1a in this embodiment.

The angle θ2 formed between the upper edge 24e and the side edge 24f1 of the main magnetic pole 24 is preferably 60° or more and less than 90°, and more preferably, 60° or more and less than 80° or less.

Figure 3:
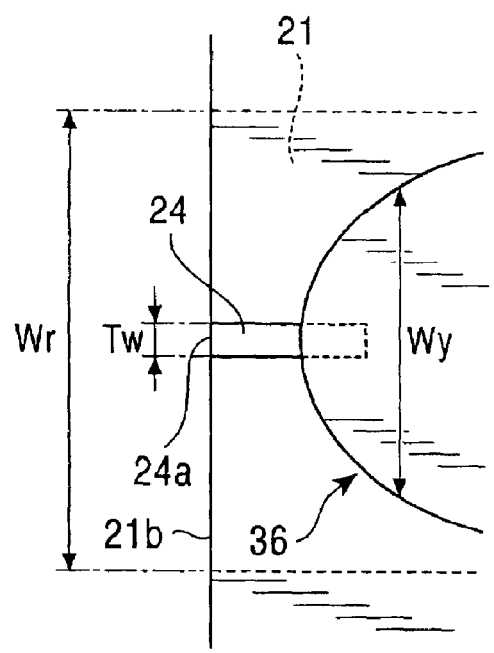
FIG. 3 is a plan view along the line indicated by the arrows IB in FIG. 1.

As shown in FIG. 3, the width Wy of the yoke layer 36 gradually increases toward the rear of the yoke layer, and the yoke layer 36 at the part having the gradually increased width Wy overlaps the main magnetic pole layer 24.

Figure 4:
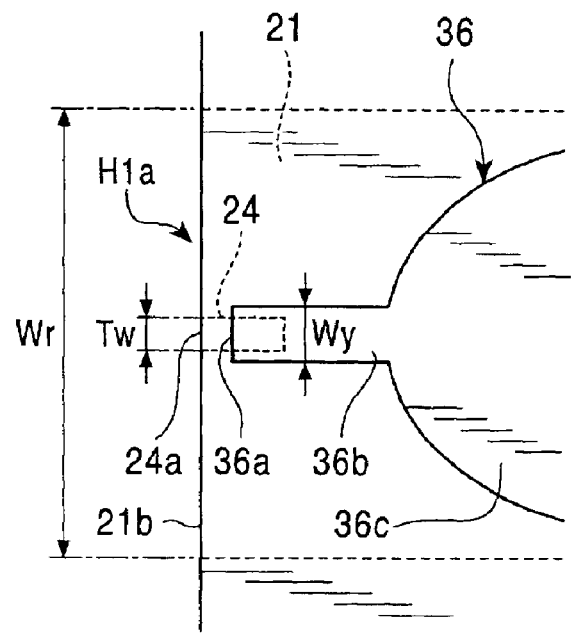
FIG. 4 is an upper plan view of the perpendicular magnetic recording head manufactured according to another embodiment of the present invention.

Otherwise, the yoke layer 36 may have a planar configuration in which the width Wy in the track width direction is narrowed at the tip region 36b at the opposing face H1a side, and the width in the track width direction gradually increases in the rear region 36c as shown in FIG. 4. The front region 36b overlaps the main magnetic pole layer 24.

Figure 5:
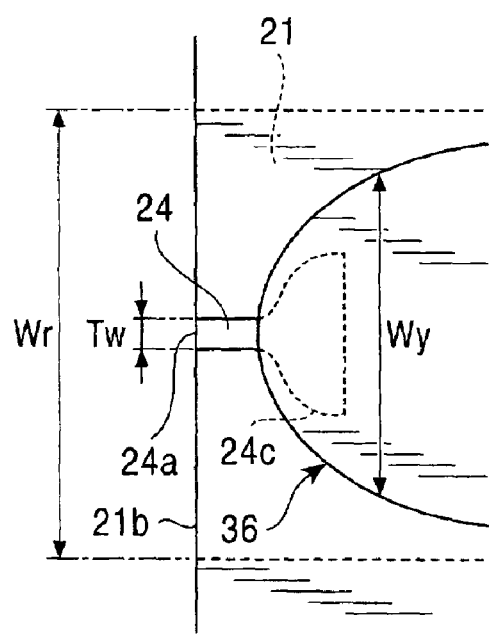
FIG. 5 is an upper plan view of the perpendicular magnetic recording head manufactured according to a different embodiment in the present invention.

Alternatively, the main magnetic pole layer 24 may have a planar configuration in which the width of the rear part 24c of the main magnetic pole layer 24 is gradually increases as shown in FIG. 5, and the yoke layer 36 may be overlaid on this rear part 24c.

The permeability of the magnetic flux from the yoke layer 36 to the main magnetic pole layer 24 is improved when the rear part 24c of the main magnetic pole layer 24 gradually increases, as shown in FIG. 5, thereby improving overwriting characteristics. The permeability of the magnetic flux from the yoke layer 36 to the main magnetic pole layer 24 is further improved when the rear part 24c of the main magnetic pole layer 24 is completely embedded in the yoke layer 36, as shown in FIG. 5, as compared with the main magnetic pole layer 24 having the rear part 24c partly exposed from the front end of the yoke layer 36.

The width Tw of the front face 24a of the main magnetic pole layer 24 in the track width direction exposed at the opposing face H1a is sufficiently narrower than the width Wr of the front face 21b of the auxiliary magnetic pole layer 21 in the track width direction exposed at the opposing face H1a in any of the structures shown in FIGS. 3, 4, and 5. The thickness H1 of the main magnetic pole layer 24 is also smaller than the thickness H3 of the auxiliary magnetic pole layer 21, as shown in FIG. 1. Consequently, the area of the front face 24a of the main magnetic pole layer 24 exposed at the opposing face H1a is sufficiently smaller than the area of the front face 21b of the auxiliary magnetic pole layer 21. The thickness H1 of the main magnetic pole layer 24 is smaller than the thickness H2 of the yoke layer 36.

The cross sectional area of the main magnetic pole layer 24 is smaller than the cross sectional area of the rear part of the yoke layer 36 as viewed on the cross section cut in a parallel plane to the opposing face H1a.

Preferably, the main magnetic pole layer 24 is made of a magnetic material having a higher saturation magnetic flux density Bs than the yoke layer 36.

A recording magnetic field is induced in the auxiliary magnetic pole layer 21 and the yoke layer 36 by the magnetic field generated by the electric current flowing through the coil layer 27 in the perpendicular magnetic recording head Hb when a recording current flows through the coil layer 27 via the lead layer 37. A leakage recording magnetic field from the front face 24a of the main magnetic pole layer 24 and from the front face 21b of the auxiliary magnetic pole layer 21 passes through the soft film Mb after penetrating the rigid film Ma of the recording medium Md in the opposing face H1a, as shown in FIG. 1. Since the area of the front face 24a of the main magnetic pole layer 24 is smaller than area of the front face 21b of the auxiliary magnetic pole layer 21, the magnetic flux φ of the leakage recording magnetic field converges on the front face 24a of the main magnetic pole layer 24. Magnetic data are recorded by magnetizing the rigid film Ma in the vertical direction by the converged magnetic flux φ. Although the magnetic flux density of the rigid film Ma is saturated by the leakage recording magnetic field generated from or absorbed by the front face 24a of the main magnetic pole layer 24, the rigid film Ma is seldom magnetized by the leakage recording magnetic field absorbed by or generated from the front face 21b of the auxiliary magnetic pole layer 21.

Since the main magnetic pole layer 24 and yoke layer 36 are formed as separate layers in the perpendicular magnetic recording head Hb, the width Tw in the track width direction and thickness H1 of the main magnetic pole layer 24 can be independently determined from the width Wy and thickness H2 of the yoke layer 36. Accordingly, recording with a narrow track may be possible by reducing the width Tw of the main magnetic pole layer 24. In addition, since the yoke layer 36 can be formed to have a large cross-sectional area, a large amount of magnetic flux of the recording magnetic field induced by the coil layer 27 can be guided from the yoke layer 36 to the main magnetic pole layer 24.

When the main magnetic pole layer 24 is made of a magnetic material having a higher saturation magnetic flux density Bs than the yoke layer 36, it is possible to impart a high density flux φ from the main magnetic pole layer 24 having a smaller width Tw and thickness T1 to the rigid film Ma in the vertical direction, thereby improving the over-writing characteristics.

Figure 6:
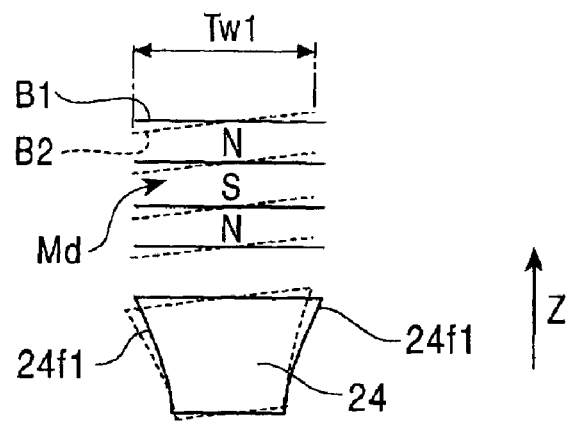
FIG. 6 illustrates the skew angle generated in the perpendicular magnetic recording head shown in FIGS. 1 to 3.

FIG. 6 shows a plan view of the recording track on the recording medium on which signals are recorded by the perpendicular magnetic recording head shown in FIGS. 1 and 2.

A skew angle, by which the side edges 24f1 of the principal magnetic pole later 24 are inclined against the tangent of the rotational direction of the recording medium Md, may be formed while the slider 11 moves from the inner to outer circumferences of the disk-shaped recording medium Md. The upper edge 24e is formed to be wider than the auxiliary magnetic pole 21 side edge 24d in the main magnetic pole layer 24 exposed at the opposing face H1a, so that the inner width in the track width direction (X-direction) gradually increases in accordance with the distance from the auxiliary magnetic pole layer 21, as shown in FIG. 2, and the front shape of the main magnetic pole layer 24 on the opposing face H1a is formed into an approximately inverted trapezoid.

Accordingly, the side edge 24f1 is prevented from largely protruding, past the recording track width Tw inclined in the side direction as shown by the broken line, when the side edges 24f1 of the main magnetic pole layer 24 form a skew angle relative to the tangent of the direction of travel (Z-direction) of the recording medium. Therefore, fringing by the side edge 24f1 is prevented, improving the off-track performance.

Since the upper edge 24e of the main magnetic pole layer 24 is a straight line, the magnetic domain boundaries B1 and B2 also become straight lines. Consequently, a clear distribution of recording magnetic field can be obtained when signals are recorded at high recording density due to the narrow pulse width of the reproduced waveform, thereby permitting the recording density in the track width direction (X-direction) to be readily increased.

The method for manufacturing the perpendicular magnetic recording head shown in FIGS. 1 to 3 will be described hereinafter. The process diagrams shown in FIGS. 7 to 10 correspond to vertical cross-sectional views of the perpendicular magnetic recording head.

Figure 7:
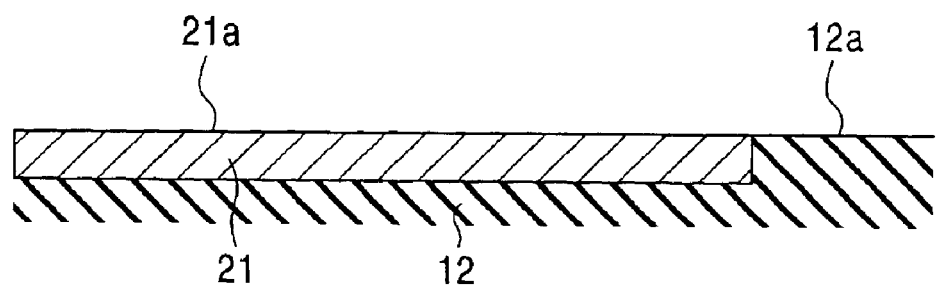
FIG. 7 is a longitudinal cross section for describing the manufacturing steps of the perpendicular magnetic recording head.
Figure 8:
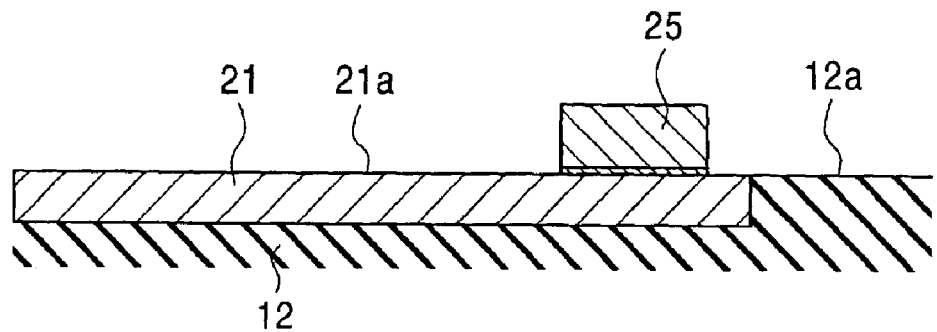
FIG. 8 is another longitudinal cross section for describing the manufacturing steps of the perpendicular magnetic recording head.

In the step shown in FIG. 7, the auxiliary magnetic pole layer 21 formed of a magnetic material is formed on the nonmagnetic insulation layer 12, and the back side of the auxiliary magnetic pole layer 21 in the height direction is filled with the nonmagnetic insulation layer 12. Subsequently, the surfaces of the auxiliary magnetic pole layer 21 and nonmagnetic insulation layer 12 are planarized using CMP technology.

Then, a coupling layer 25 made of a magnetic material is plated at the back of the auxiliary magnetic pole layer 21 in the height direction. The coupling layer 25 may be formed after forming a coil layer 27, as will be described hereinafter.

Then, a nonmagnetic insulation layer 26 is formed by sputtering an inorganic insulation material from the surface 21a of the auxiliary magnetic pole layer 21 to the surface of the coupling layer 25. Subsequently, a coil layer 27 is formed on the nonmagnetic insulation layer 26 using a conductive material such as Cu by a frame plating method, followed by forming a push-up layer 31 by plating. The coil layer 27 is formed with a sufficiently lower height than the height of the coupling layer 25. The coil layer 27 and push-up layer 31 are covered with an insulation layer 32, followed by forming an insulation layer 33 by sputtering an inorganic insulation material so as to cover all the layers.

Figure 9:
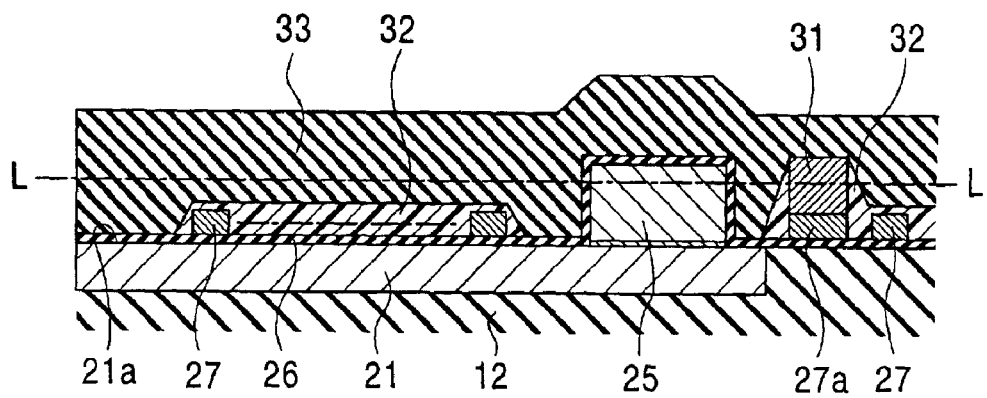
FIG. 9 is a different longitudinal cross section for describing the manufacturing steps of the perpendicular magnetic recording head.

Each layer deposited as shown in FIG. 9 is polished from the upward direction in the drawing using CMP technology. The polishing work is performed until a horizontal face (the face denoted by a line L—L) crossing the insulation layer 33, the coupling layer 25, and the push-up layer 31 appear.

Figure 10:
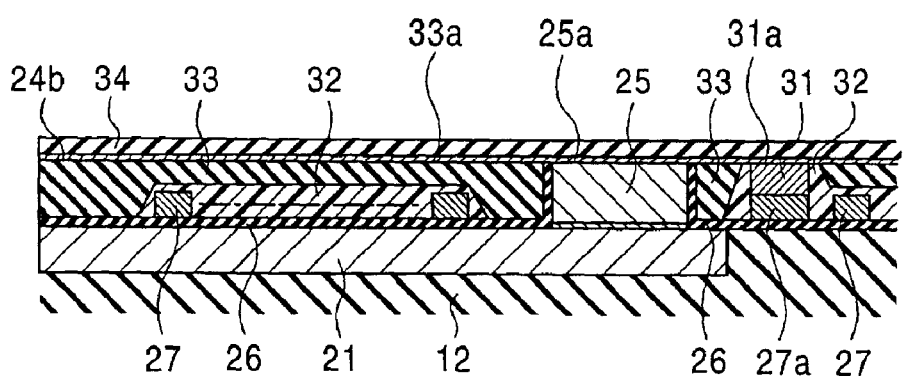
FIG. 10 is another longitudinal cross section for describing the manufacturing steps of the perpendicular magnetic recording head.

The surface 25a of the coupling layer 25, the surface 33a of the insulation layer 33, and the surface 31a of the push-up layer 31 are made to lie in the same plane as a result of the polishing, as shown in FIG. 10. A plating underlayer 24b is deposited on the surface 25a of the coupling layer 25, on the surface 33a of the insulation layer 33, and on the surface 31a that have been planarized, and an inorganic insulation layer 34 is deposited on the plating underlayer 24b using $Al_2O_3$ or $SiO_2$.

The plating underlayer 24b is formed using a nonmagnetic material such as Cu, Au, Pd, Rh, Ru, Pt, NiLu, NiPt, NiPd, NiW, NiB, NiMo, Ir, NiCu, NiCr, Cr, and Ti.

The method for manufacturing the main magnetic pole layer 24 of the perpendicular magnetic recording head shown in FIGS. 1 to 3 will be described hereinafter.

The first method for forming a groove 34a in the inorganic insulation layer 34 in order to form the main magnetic pole layer 24 on the inorganic insulation layer 34 by plating will be described at first with reference to FIGS. 11 and 12.

Figure 11A:
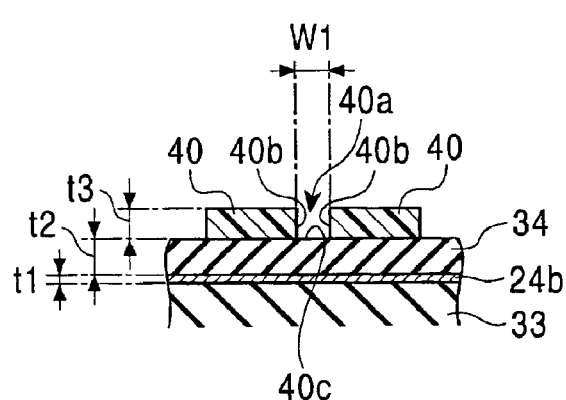
FIG. 11A is a transverse cross-sectional view of the perpendicular magnetic recording head provided for describing the manufacturing steps of the perpendicular magnetic recording head.
Figure 11B:
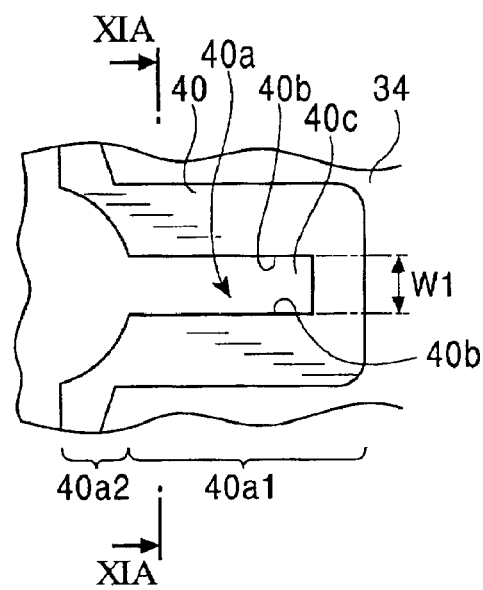
FIG. 11B is an upper plan view of the perpendicular magnetic recording head provided for describing the manufacturing steps of the perpendicular magnetic recording head.

A resist layers 40 on which the grooves 40a is patterned is laminated on the inorganic insulation layer 34 as shown in FIGS. 11A and 11B after the step shown in FIG. 10. FIG. 11B is a fragmentary cross-section viewed from the top in FIG. 10, and FIG. 11A shows a fragmentary cross-section viewed along the line indicated by the arrow XIA—XIA in FIG. 11B.

The resist layer 40 is formed over the entire surface of the inorganic insulation layer 34, and the groove 40a having a given depth from the opposing face to the back of the opposing face and a hollow pattern corresponding to the main magnetic pole layer 24 is formed by exposing with light at a portion that serves as the opposing face to the recording medium. The groove 40a is composed of a groove 40a2 for storing a plating liquid and a main magnetic pole forming groove 40a1 having a constant size in the inner width direction (Y-direction), wherein the size in the inner width direction (Y-direction) of the groove 40a2 increases toward the left side in the drawing.

The thickness t1 of the plating underlayer 24b is 15 to 30 nm, the thickness t2 of the inorganic insulation layer 34 is 0.3 to 0.5 μm, and the thickness t3 of the resist layer 40 is 0.5 to 1.5 μm. The groove 40a has a dimension W1 in the inner width direction of 0.3 to 0.5 μm.

Figure 12:
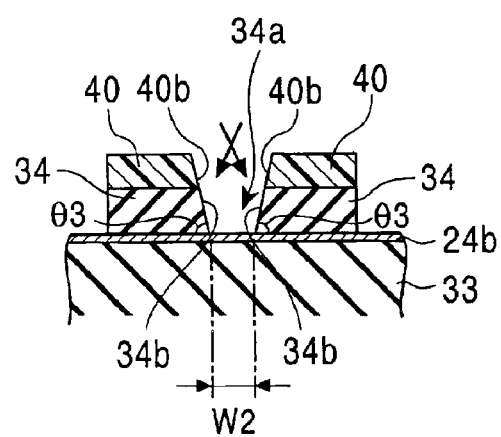
FIG. 12 is a transverse cross-sectional view of the perpendicular magnetic recording head provided for describing the manufacturing steps of the perpendicular magnetic recording head.

The inorganic insulation layer 34 exposed in the groove 40a is shaved by plasma etching or reactive ion etching (RIE) in the step shown in FIG. 12. The inorganic insulation layer 34 as well as the resist layer 40 are shaved by plasma etching. The corners 40c of the resist layers 40 are shaved at first, forming inclined faces on the side faces 40b of the groove 40a. In addition, the inner width of the groove 34a in the track width direction formed in the inorganic insulation layer 34 gradually increases in accordance with the distance from the auxiliary magnetic pole layer 21, forming inclined faces on the side faces 34b.

The angle θ3 formed between the surface of the plating underlayer 24b and the side face 34b of the inorganic insulation layer 34 is adjusted to be 60° or more and less than 90°, preferably to be 60° or more and 80° or less. The angle θ3 is adjusted in the range of 65° to 80° in the present invention. Setting the angle θ3 allows the taper angle of the side face of the main magnetic pole layer 24 to be restricted.

The width W2 of the bottom face 34c of the groove 34a in the track width direction is in the range of 0.2 to 0.32 μm.

The second method for forming the groove 34a in the inorganic insulation layer 34 will be described hereinafter with reference to FIGS. 11A and 11B.

The resist layer 40 is formed over the entire inorganic insulation layer 34, as shown in FIG. 1, and the groove 40a having a given depth from the opposing face to the back of the opposing face and a hollow pattern corresponding to the main magnetic pole layer 24 is formed by exposing with light at a portion that serves as the opposing face opposing the recording medium. The groove 40a is composed of a groove 40a2 for storing a plating liquid and a main magnetic pole forming groove 40a1 having a constant size in the inner width direction (Y-direction), wherein the size in the inner width direction (Y-direction) of the groove 40a2 increases toward the left side in the drawing, as hitherto described.

After forming the groove 40a, the resist layer 40 is heat-treated to form inclined or curved side faces 40b of the groove 40a. In other words, the inner width of the groove 40a in the track width direction gradually increases with respect to the distance from the auxiliary magnetic pole layer 21. The side faces 40b of the groove 40a are formed as inclined faces in FIG. 12.

The heat-treatment conditions of the resist layer 40 are as follows:

Heat-treatment temperature: 100 to 120° C., and

Heat-treatment time: 10 minutes

The angle θ4 formed between the surface of the plating underlayer 24b and side face 40b of the resist layer 40 is adjusted to be 60° or more and less than 90°, preferably to be 60° or more and 80° or less. The angle θ4 is 80° in this embodiment. The taper angle of the side face of the main magnetic pole layer 24 formed is restricted by setting the angle θ4.

The bottom face 40c of the groove 40a has a width of 0.3 μm in the track width direction.

In another method, inclined or curved side faces 40b of the groove 40a are formed in the resist layer 40 by adjusting the patterning accuracy by selecting the sensitivity of the resist layer 40 material to light exposure in order to allow the inner width at the upper face side to be larger than the width at lower face side of the resist layer 40 during the exposure and development steps.

Figure 14:
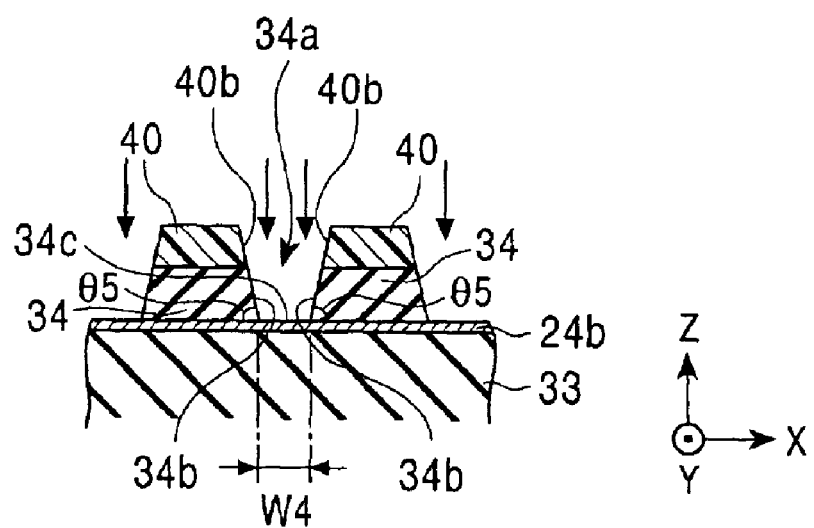
FIG. 14 is a different transverse cross-sectional view of the perpendicular magnetic recording head provided for describing the manufacturing steps of the perpendicular magnetic recording head.

The inorganic insulation layer 34 exposed in the groove 40a is shaved by reactive ion etching (RIE) in the step shown in FIG. 14. Since the side faces 40b of the groove 40a are inclined or curved, the groove 34a formed in the inorganic insulation layer 34 also has inclined or curved side faces 34b. In other words, the inner width of the groove 34a in the track width direction formed in the inorganic insulation layer 34 gradually increases in accordance with the distance from the auxiliary magnetic pole layer 21.

Figure 13:
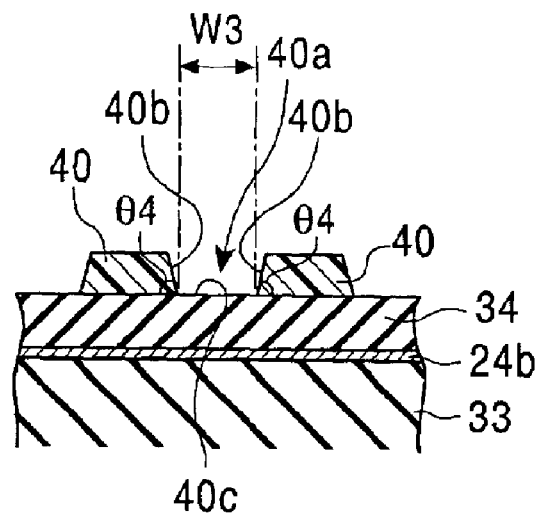
FIG. 13 is another transverse cross-sectional view of the perpendicular magnetic recording head provided for describing the manufacturing steps of the perpendicular magnetic recording head.

The angle θ5 formed between the surface of the plating underlayer 24b and the side face 34b of the inorganic insulation layer 34 is determined depending on the angle θ4, the inner width W3 of the bottom face of the groove 40a, the film thickness t3 of the resist layer 40, and the thickness t2 of the inorganic insulation layer 34, all of which are determined by prescribing the kind of materials for the resist layer and the heat-treatment temperature in the step shown in FIG. 13 in this embodiment.

The angle θ5 is 60° or more and less than 90°, preferably 60° or more and 80° or less. The angle θ5 is 80° in this embodiment. The taper angle of the side face of the main magnetic pole layer 24 formed is determined by setting the angle θ5.

The bottom face 34c of the groove 34a has a width W4 of 0.2 μm in the track width direction in FIG. 14.

The third method for forming the groove 34a in the inorganic insulation layer 34 will be described hereinafter with reference to FIGS. 15 and 16.

Figure 15:
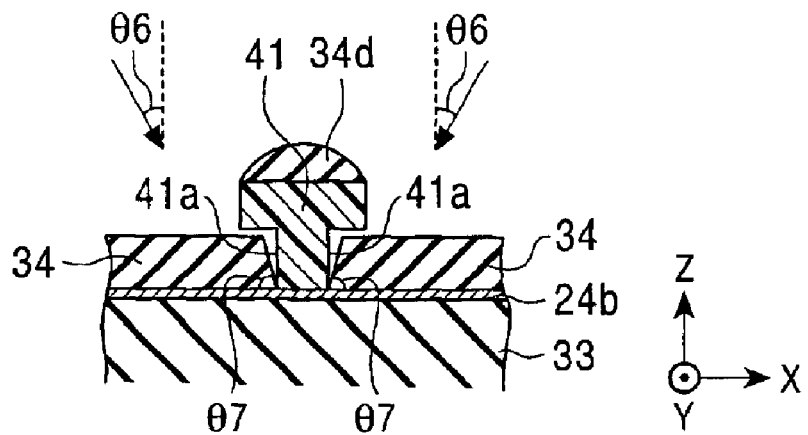
FIG. 15 is another transverse cross-sectional view of the perpendicular magnetic recording head provided for describing the manufacturing steps of the perpendicular magnetic recording head.

A lift-off resist layer 41 having the shape of the groove 34a formed in the inorganic insulation layer 34 is patterned on the deposited plating lower layer 24b in the step shown in FIG. 15. Cut portions 41a and 41a are formed on the lower face of the lift-off resist layer 41.

Then, the inorganic insulation layer 34 is deposited by a sputtering method such as ion-beam sputtering, long throw sputtering and collimation sputtering from a given angle $\theta 6$ from the perpendicular direction to the track width direction. The inorganic insulation layer 34 is deposited deep into the cut portions 41a formed on the lower face of the resist layer 41.

For example, a target prepared in a composition of the inorganic insulation layer 34 is tilted relative to a substrate on which the perpendicular magnetic recording head is formed, and the inorganic insulation layer 34 is deposited on the plating underlayer 24b by ion-beam sputtering while allowing the target to move on the substrate.

Otherwise, the substrate may be moved in an inclined direction relative to the target while the target remains fixed. Or, a layer 34d having the same composition as the inorganic insulation layer 34 may be deposited on the resist layer 41, as shown in FIG. 15.

The angle $\theta 6$ is preferably in the range of 0° to 30°. The angle $\theta 7$ formed between the surface of the plating underlayer 24b and the resist layer 41 is adjusted to be 60° or more and less than 90°, preferably 60° or more and 80° or less. The angle $\theta 7$ is 80° in this embodiment. The taper angle of the side face of the main magnetic pole layer 24 formed is determined by prescribing the angle $\theta 7$.

The width W5 of the bottom face 34c of the groove 34a in the track width direction is 0.2 µm.

Figure 16:
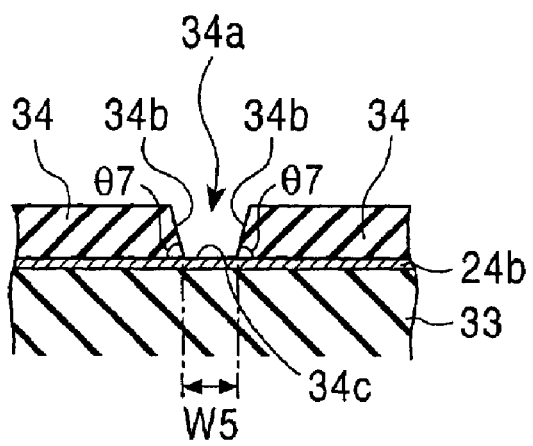
FIG. 16 is another transverse cross-sectional view of the perpendicular magnetic recording head provided for describing the manufacturing steps of the perpendicular magnetic recording head.

When the resist layer 41 is removed by lift-off using a resist peeling liquid as shown in FIG. 16, the inorganic insulation layer 34 in which a groove 34a having inclined or curved faces at both sides 34b is formed. The inner width of the groove 34a in the track width direction formed on the inorganic insulation layer 34 gradually increases in accordance with the distance from the auxiliary magnetic pole layer 21.

The inorganic insulation layer 34 may be formed using at least one of $Al_2O_3$, $SiO_2$, $Ta_2O_5$, $TiO$, $AlN$, $AlSiN$, $TiN$, $SiN$, $NiO$, $WO$, $WO_3$, $BN$, $CrN$, $SiON$, $Si_3N_4$, $AlN$, and $SiON$.

The inorganic insulation layer 34 having the groove 34a may be formed by any of the foregoing three methods.

The angles $\theta 3$, $\theta 5$, and $\theta 7$ formed between the side face 34b of the inorganic insulation layer 34 and the plating underlayer 24b as shown in FIGS. 12, 14, and 16 are equal to the angle formed between the side face 24f of the main magnetic pole layer 24 and the plating underlayer 24b, as well as to the angle $\theta 2$ (taper angle) formed between the upper edge 24e and side face 24f of the main magnetic pole layer 24.

Figure 17A:
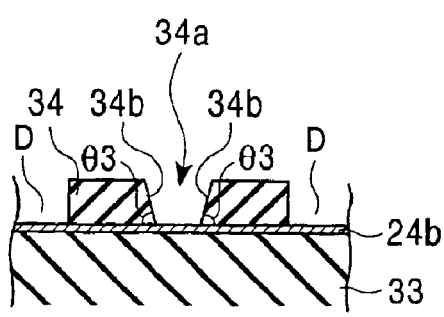
FIG. 17A is a transverse cross-sectional view of the perpendicular magnetic recording head provided for describing the manufacturing steps of the perpendicular magnetic recording head.
Figure 17B:
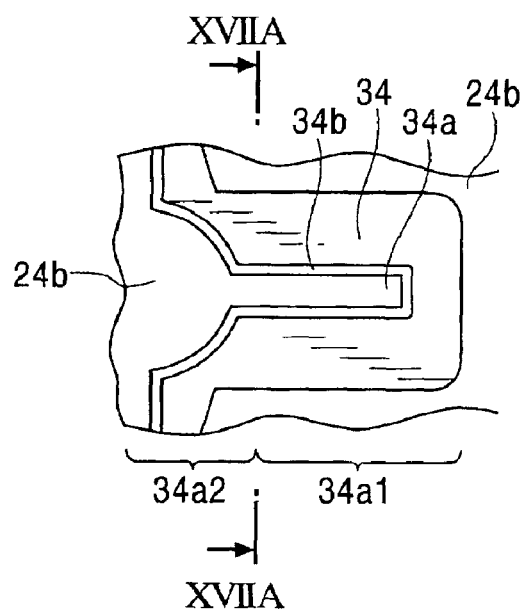
FIG. 17B is an upper plan view of the perpendicular magnetic recording head provided for describing the manufacturing steps of the perpendicular magnetic recording head.

FIGS. 17A and 17B show the inorganic insulation layer 34 formed by the first method. FIG. 17B is an upper fragmentary plan view in the vicinity of the inorganic insulation layer 34, and FIG. 17A is a fragmentary cross-sectional view along the line indicated by the line XVIIA–XVIA.

A groove 34a1 for forming the main magnetic pole and a groove 34a2 for storing a plating liquid are formed on the inorganic insulation layer 34, wherein the groove 34a1 has an inner width that gradually increases in the track width direction in accordance with the distance from the auxiliary magnetic pole layer, and a given depth in the height direction on the cross section parallel to the opposing face opposing the recording medium. The portion where the plating underlayer 24b is exposed outside the inorganic insulation layer 34 is a dummy forming part D for forming a dummy plating layer in the plating step thereafter.

Figure 18:
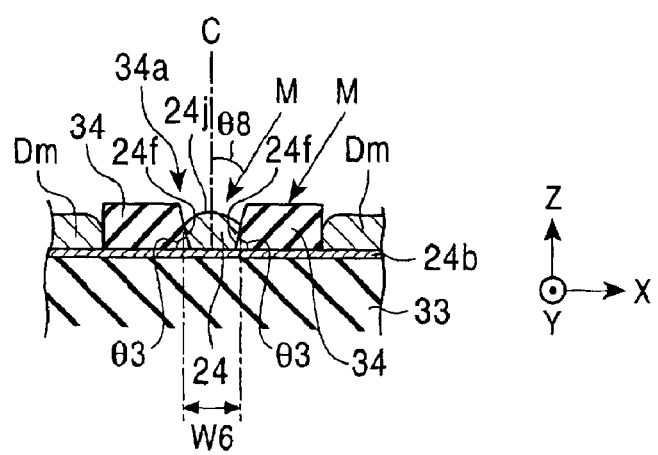
FIG. 18 is a transverse cross-sectional view of the perpendicular magnetic recording head provided for describing the manufacturing steps of the perpendicular magnetic recording head.

Subsequently, the main magnetic pole layer 24 and the dummy plating layer Dm are plated in the groove 34 and on the dummy forming part D using a magnetic material such as a NiFe alloy, as shown in FIG. 18.

The dummy plating layer Dm permits the quality of plating to be improved. A pulse plating method is used for forming the plating layer. However, the dummy forming part D and dummy plating layer Dm are not always necessary. For example, the structure shown in FIG. 22 may be obtained by covering the dummy forming part D with a resist layer before the main magnetic pole layer 24 is plated after the step shown in FIG. 17, and only the main magnetic pole layer 24 is plated while only the groove 34a remains open, followed by removing the resist layer covering the dummy forming part D.

The inner width W6 on the surface 24j of the main magnetic pole layer 24 is adjusted to be 0.3 µm in this embodiment. The inner width W6 on the surface 24j of the main magnetic pole layer 24 is determined by prescribing the angle $\theta 3$ formed between the surface of the plating underlayer 24b and side face 34b of the inorganic insulation layer, the width W2 on the bottom face 34c of the groove 34a in the track width direction and the thickness of the main magnetic pole layer 24.

The surface 24j immediately after plating forms a curved surface swelled at the center, as shown in FIG. 18.

Subsequently, anisotropic ion-milling is performed from above, as shown in FIG. 18, by irradiating milling particles M from a direction inclined by a given angle $\theta 8$ relative to the center line C in the longitudinal direction of the main magnetic pole layer 24.

Since ion-milling is applied to the main magnetic pole layer 24 while the inorganic insulation layer 34 is located at both sides of the main magnetic pole layer 24, only the surface 24j of the main magnetic pole layer 24 is shaved by ion-milling in this step.

Since the main magnetic pole layer 24 is formed in an inverted trapezoidal shape, as shown in FIG. 18, the size in the inner width direction of the surface 24j can be reduced by polishing in the height direction. This means that the width Tw of the perpendicular magnetic recording head can be reduced by polishing the surface 24j of the main magnetic pole layer 24.

Since only the surface 24j of the main magnetic pole layer 24 is polished by ion-milling, and the side faces 24f remain unpolished, the main magnetic pole layer 24 is milled only in the height direction (Y-direction). Accordingly, the machining accuracy of the main magnetic pole layer 24 by ion-milling in this step is readily improved to precisely determine the width Tw of the perpendicular magnetic recording head.

The surface 24j of the main magnetic pole layer 24 is planarized by ion-milling from an inclined direction relative to the center line C in the longitudinal direction of the main magnetic pole layer 24.

The given angle $\theta 8$ relative to the center line C is preferably 35° to 80°, and more preferably 40° to 50°. The angle $\theta 8$ is adjusted to 45° in this embodiment.

The surface 24j of the main magnetic pole layer 24 is planarized after ion-milling, and the cross-section thereof forms a straight line.

Figure 20:
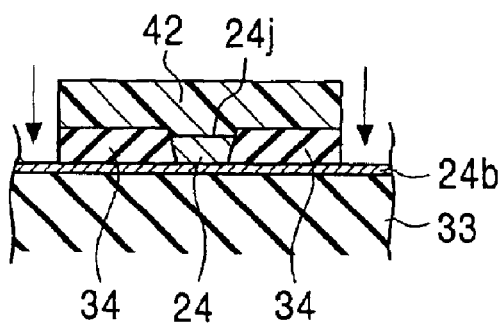
FIG. 20 is a different transverse cross-sectional view of the perpendicular magnetic recording head provided for describing the manufacturing steps of the perpendicular magnetic recording head.

The main magnetic pole layer 24 and inorganic insulation layer 34 are protected by covering with the resist 42 after completing the ion-milling step, as shown in FIG. 20, and the dummy plating layer Dm is removed by etching. In addition, the plating underlayer 24b except the lower layers of the main magnetic pole layer 24 and inorganic insulation layer 34 is removed by performing isotropic ion-milling or anisotropic ion-milling by which milling particles M are irradiated from a perpendicular direction, or from above in FIG. 20, to the plating underlayer 24*b*, followed by removing the resist layer 42 to obtain the structure shown in FIG. 23.

Figure 21:
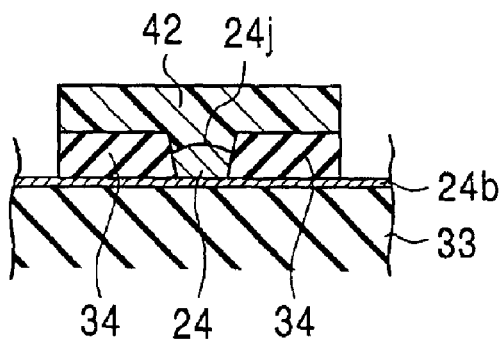
FIG. 21 is another transverse cross-sectional view of the perpendicular magnetic recording head provided for describing the manufacturing steps of the perpendicular magnetic recording head.

Alternatively, the main magnetic pole layer 24 and inorganic insulation layer 34 are protected with the resist 43 as shown in FIG. 21, after forming the main magnetic pole layer 24 and dummy plating layer Dm (FIG. 18) and before applying ion-milling for shaving the surface 24*j* of the main magnetic pole layer 24, followed by removing the dummy plating layer Dm by etching.

Only the dummy plating layer is removed in the step shown in FIG. 21, and the plating underlayer 24*b*, as an underlayer of the dummy plating layer Dm, is not removed. Consequently, the structure shown in FIG. 22 is obtained after removing the resist layer 43.

Figure 22:
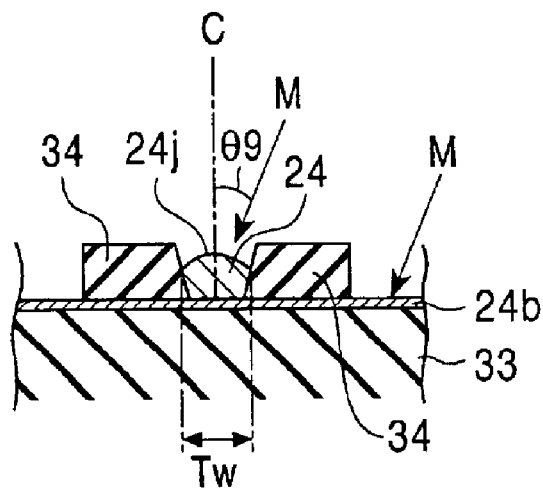
FIG. 22 is another transverse cross-sectional view of the perpendicular magnetic recording head provided for describing the manufacturing steps of the perpendicular magnetic recording head.

As shown in FIG. 22, the surface 24*j* of the main magnetic pole layer 24 has a curved face swelled at the center. Then, anisotropic ion milling is performed by irradiating milling particles M from a direction with a given inclination angle θ9 relative to the central line C in the longitudinal direction, or from above, as shown in FIG. 22, to shave the surface 24*j* of the main magnetic pole layer 24, thereby the plating underlayer 24*b* is simultaneously removed except the main magnetic pole layer 24 and inorganic insulation layer 34.

Since the main magnetic pole layer 24 is formed into an approximately inverted trapezoid in the ion milling step shown in FIG. 22, the size of the surface 24*j* in the inner width direction is reduced by shaving the main magnetic pole layer 24 in the height direction. This means that the width Tw of the perpendicular magnetic recording head may be further reduced by polishing the surface 24*j* of the main magnetic pole layer 24.

Only the surface 24*j* of the main magnetic pole layer 24 is also polished by ion-milling in this embodiment. Since the side faces 24*f* remain unpolished, the main magnetic pole layer 24 is shaved only in the height direction (Y-direction). Consequently, the machining accuracy of the main magnetic pole layer 24 is facilitated by ion-milling in this step, allowing the width Tw of the perpendicular magnetic recording head to be precisely determined.

The surface 24*j* of the main magnetic pole layer 24 can be planarized by ion milling from an inclined direction relative to the center line in the longitudinal direction of the main magnetic pole layer 24.

The given angle θ9 relative to the center line C is preferably 35° to 80°, and more preferably 40° to 50°. The angle θ9 is adjusted to be 45° in this embodiment.

Figure 23:
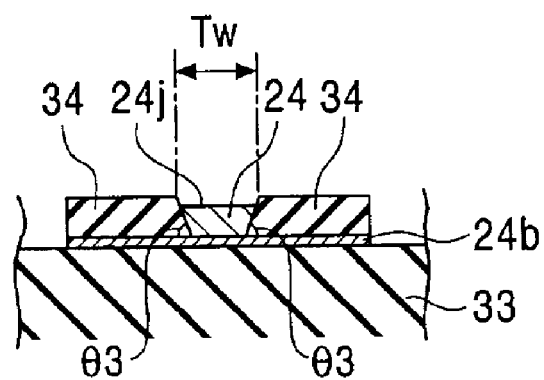
FIG. 23 is another transverse cross-sectional view of the perpendicular magnetic recording head provided for describing the manufacturing steps of the perpendicular magnetic recording head.

The surface 24*j* of the main magnetic pole layer 24 is planarized to have a linear cross section by ion-milling, and the plating underlayer 24*b*, except for the underlayers of the main magnetic pole layer 24 and inorganic insulation layer 34, is removed (FIG. 23).

The method for forming the main magnetic pole layer 24 includes a deposition method by a thin film deposition method by sputtering, except for the plating method using a magnetic material such as the NiFe alloy as hitherto described.

FIGS. 24 to 28 are transverse cross-sections of the perpendicular magnetic recording head in the process for forming the main magnetic pole layer 24 by sputtering.

Figure 24:
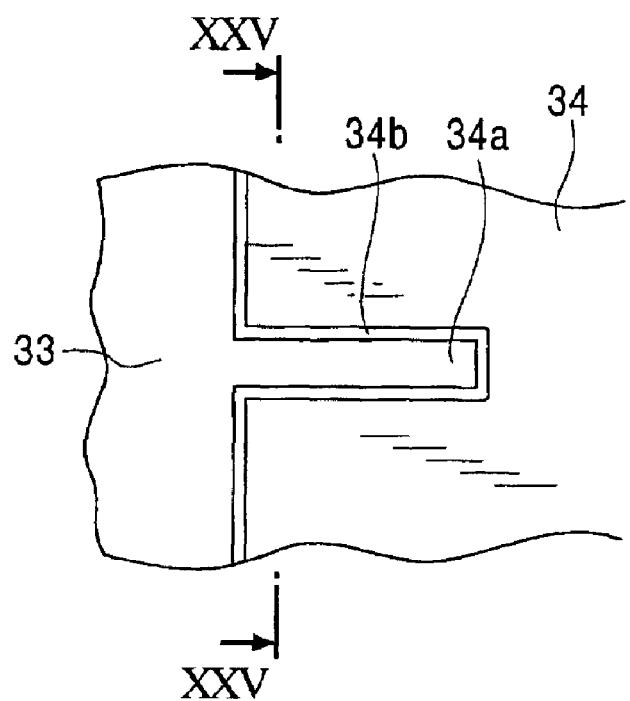
FIG. 24 a plan view of the perpendicular magnetic recording head provided for describing the manufacturing steps of the perpendicular magnetic recording head.

The inorganic insulation layer 34 on which the groove 34*a* is formed is formed by the steps shown in FIGS. 10 to 16. However, deposition of the plating underlayer 24*b* is not needed when the main magnetic pole layer 24 is formed by sputtering. In forming the main magnetic pole layer 24 by a film deposition process, the process only include the steps of forming the main magnetic pole layer forming groove 34*a* after depositing the inorganic insulation layer all over the insulation layer as shown in FIG. 24, and processing the side faces 34*b* and 34*b* into inclined or curved faces. Accordingly, the dummy plating part and plating liquid storing part are not required in this process.

Figure 25:
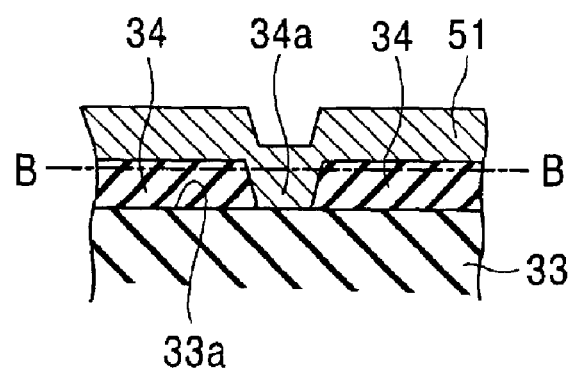
FIG. 25 is a transverse cross-sectional view of the perpendicular magnetic recording head provided for describing the manufacturing steps of the perpendicular magnetic recording head.

After forming the inorganic insulation layer 34, a magnetic material layer 51 is formed in the area including the groove 34*a* and on the inorganic insulation layer 34 by sputtering or ion-beam sputtering using a magnetic material (FIG. 25).

Subsequently, the magnetic material layer 51 formed in the groove 34*a* is removed to form the main magnetic pole layer 24.

For forming the main magnetic pole layer 24, the magnetic material layer is polished or shaved until the horizontal plane (B—B plane) crossing the inorganic insulation layer 34 and magnetic material layer 51 shown in FIG. 25 are exposed at the surface by CMP or ion-milling.

Figure 26:
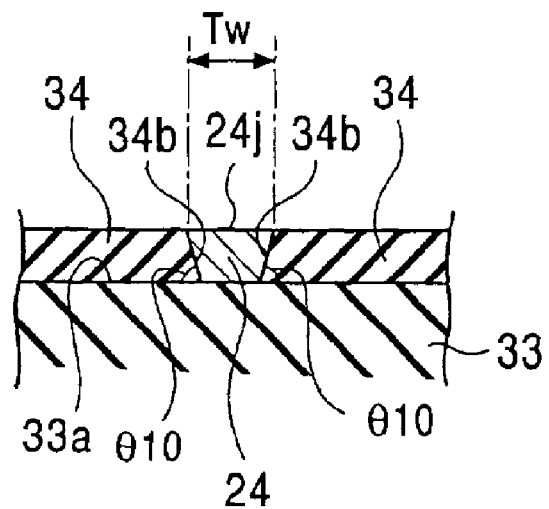
FIG. 26 is another transverse cross-sectional view of the perpendicular magnetic recording head provided for describing the manufacturing steps of the perpendicular magnetic recording head.

The structure of the recording head on which the main magnetic pole layer 24 is formed is shown in FIG. 26. The main magnetic pole layer 24 is also formed as an approximately inverted trapezoid in FIG. 26, and the taper angle is equal to the angle θ10 formed between the surface 33*a* of the insulation layer 33 and the side face 34*b* of the inorganic insulation layer 34. The angle θ10 is adjusted to be 60° or more and less than 90°, and preferably 60° or more and 80° or less. The angle θ10 is 80° in this embodiment.

Since the main magnetic pole layer 24 is formed as an approximately inverted trapezoid as shown in FIG. 26, the inner width of the upper face 24*j* may be reduced by polishing or shaving in the height direction. In other words, the track width of the perpendicular magnetic recording head Tw is determined by adjusting the degree of polishing or shaving of the surface 24*j* of the main magnetic pole layer 24.

It is also possible to planarize the surface 24*j* of the main magnetic pole layer 24 by polishing or shaving the surface of the main magnetic pole layer 24.

Figure 27:
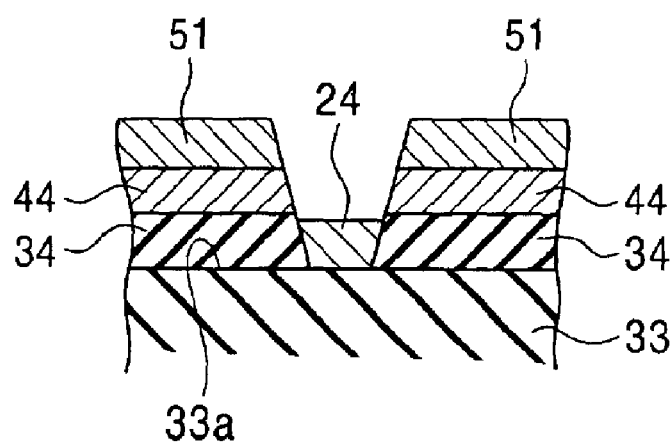
FIG. 27 is a different transverse cross-sectional view of the perpendicular magnetic recording head provided for describing the manufacturing steps of the perpendicular magnetic recording head.
Figure 28:
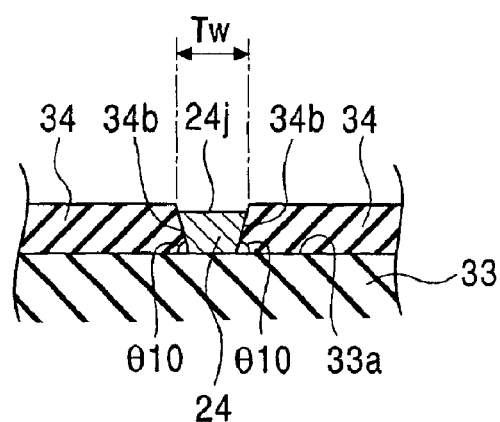
FIG. 28 is another transverse cross-sectional view of the perpendicular magnetic recording head provided for describing the manufacturing steps of the perpendicular magnetic recording head.

Otherwise, the recording head may be formed by the steps of covering all over the area on the inorganic insulation layer 34 with the resist layer 44 except the area on the groove 34*a* as shown in FIG. 27 after forming the inorganic insulation layer 34, depositing the magnetic material in the groove 34*a* and on the resist layer 44 by sputtering or ion-beam sputtering, forming the main magnetic pole layer 24 in the groove 34*a* and magnetic material layer 51 on the resist layer 44, and removing the resist layer 44 and magnetic material layer 51 as shown in FIG. 28. The track width Tw of the perpendicular magnetic recording head is determined by the film thickness of the main magnetic pole layer 24 during the film deposition step.

The main magnetic pole layer 24 is also formed as an approximately inverted trapezoid having a planarized surface 24*j* as shown in FIG. 28, and the taper angle is equal to the angle θ10 formed between the surface 33*a* of the insulation layer 33 and the side face 34*b* of the inorganic insulation layer 34. The angle θ10 is adjusted to be 60° or more and less than 90°, preferably to be 60° or more and 80° or less. The angle θ10 is 80° in this embodiment.

The track width Tw of the perpendicular magnetic recording head is determined by polishing or shaving the main magnetic pole layer 24 in the height direction by CMP or ion-milling.

The angle θ10 formed between the side face 34*b* of the inorganic insulation layer 34 and the surface 33*a* of the insulation layer 33 shown in FIGS. 26 and 28 is equal to the angle formed between the side face 24f of the main magnetic pole layer 24 and the surface 33a of the insulation layer 33, as well as to the angle θ2 (taper angle) formed between the upper edge 24e and side face 24f of the main magnetic pole layer 24 as shown in FIG. 2.

Figure 29:
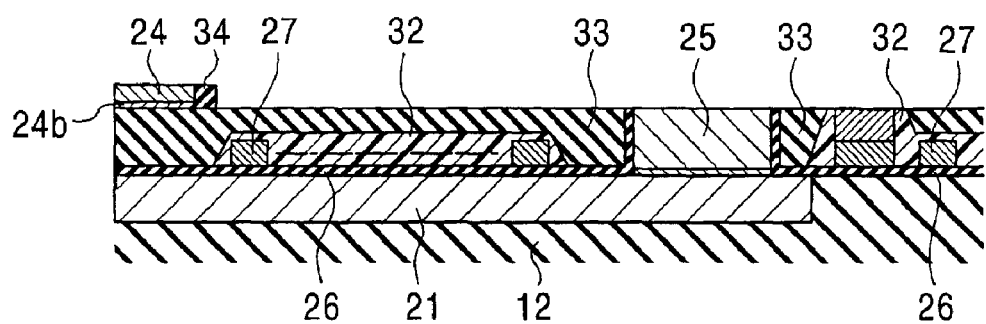
FIG. 29 is a longitudinal cross-sectional view of the perpendicular magnetic recording head provided for describing the manufacturing steps of the perpendicular magnetic recording head.

FIG. 29 shows a longitudinal cross-section of the perpendicular magnetic recording head after completing the step shown in FIG. 23. The cross-sectional shape of the main magnetic pole layer 24 is an approximately inverted trapezoid as shown in FIG. 23 in the perpendicular magnetic recording head shown in FIG. 29.

Figure 30:
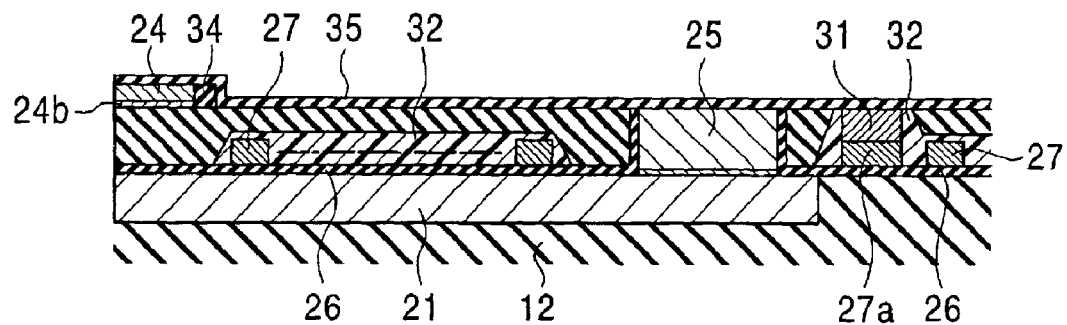
FIG. 30 is another longitudinal cross-sectional view of the perpendicular magnetic recording head provided for describing the manufacturing steps of the perpendicular magnetic recording head.
Figure 31:
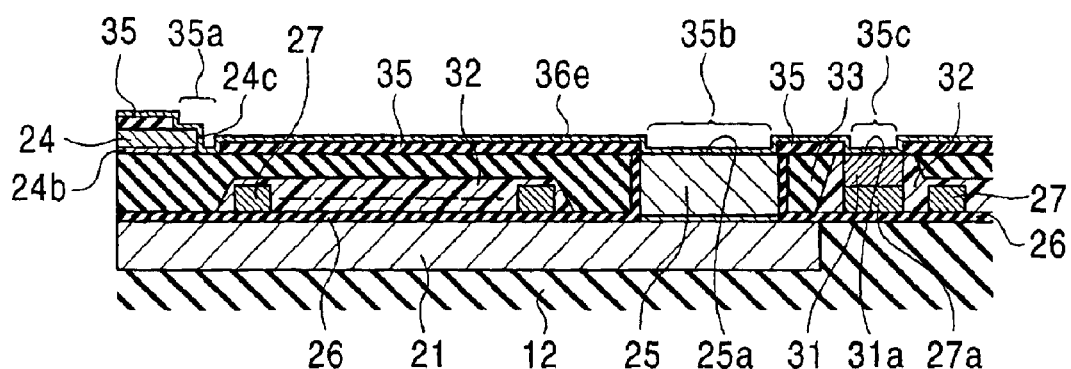
FIG. 31 is a different longitudinal cross-sectional view of the perpendicular magnetic recording head provided for describing the manufacturing steps of the perpendicular magnetic recording head.
Figure 32:
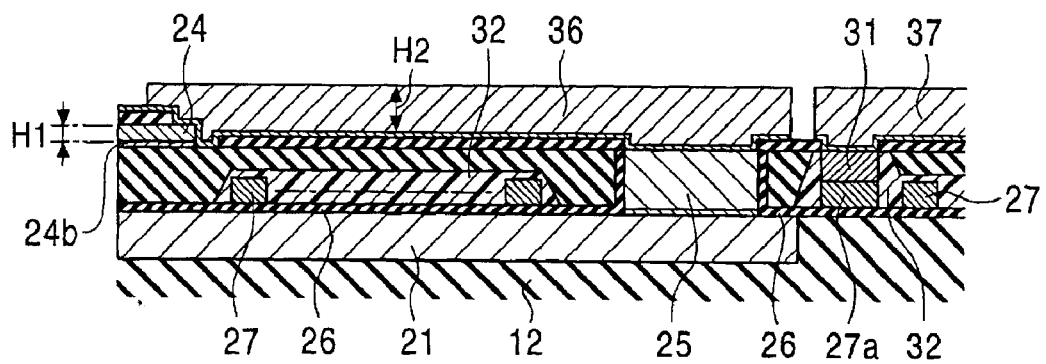
FIG. 32 is another longitudinal cross-sectional view of the perpendicular magnetic recording head provided for describing the manufacturing steps of the perpendicular magnetic recording head.

Subsequently, an inorganic insulation layer 35 made of an inorganic material such as $Al_2O_3$ or $SiO_2$ is deposited on the main magnetic pole layer 24, insulation layer 33, inorganic insulation layer 34, coupling layer 25 and push-up layer 31 as shown in FIG. 30.

The surface 24j of the main magnetic pole layer 24 may be planarized by CMP after covering the main magnetic pole layer 24 with the inorganic insulation layer 35, except for the method as hitherto described.

In the next step, holes 35a, 35b and 35c are formed on the inorganic insulation layers 34 and 35 so as to expose the rear part 24c of the main magnetic pole layer 24, the surface 25a of the coupling layer 25 and the surface 31a of the coupling layer 31. After forming the holes 35a, 35b and 35c, a plating underlayer 36e is formed on the rear part 24c of the main magnetic pole layer 24, inorganic insulation layers 35, the surface 25a of the coupling layer 25 and the surface 31a of the pick-up layer 31.

The plating underlayer 36e is formed using a magnetic material such as NiFe or Ni, or a nonmagnetic material such as Cu, Au, Pd, Rh, Ru, Pt, NiLu, NiPt, NiPd, NiW, NiB, NiMo, Ir, NiCu, NiCr, Cr, and Ti.

Subsequently, a magnetically coupled yoke layer 36 is plated on the main magnetic pole layer 24 and coupling layer 25. The width of the yoke layer 36 in the track width direction is wider than the width of the main magnetic pole layer at the position where the yoke layer is overlaid on the main magnetic pole layer 24.

The film thickness H2 of the yoke layer 36 is adjusted to be larger than the film thickness h1 of the main magnetic pole layer 24 in this embodiment.

Accordingly, the cross sectional area of the main magnetic pole layer 24 becomes smaller than the cross-sectional area of the rear part of the yoke layer 36 viewed on the cross section cut in a parallel plane to the opposing face H1a.

The main magnetic pole layer 24 is preferably formed of a magnetic material having a higher saturation magnetic flux density Bs than the yoke layer 36.

Subsequently, a lead layer 37 that is electrically connected to the pick-up layer 31 is formed on the pick-up layer 31 by plating using a conductive material such as Cu, and excess plating underlayers 36d around the yoke layer 36 and lead layer 37 are removed by ion-milling.

It is also possible to form the lead layer 37 at the same time for forming the yoke layer 36.

Then, the front face 21b of the auxiliary magnetic pole layer 21, the front face 33b of the insulation layer 33 and the front face 24a of the main magnetic pole layer 24 are exposed at the opposing face H1a by polishing the opposing face H1a after forming the protective layer 13 shown in FIG. 1, so that these faces lay on the same plane.

Or, the opposing face 11a of the slider 11 shown in FIG. 1 and the opposing face H1a of the perpendicular magnetic recording head Hb are covered with a protective film such as DLC mainly comprising carbon, if necessary.

The yoke layer is also formed after the step shown in FIG. 26 or 28, as in the step shown in FIGS. 29 to 32.

The groove 40a may be elongated in the height direction until it overlaps the coupling layer 25 in the step shown in FIG. 11, in order to magnetically couple the main magnetic pole layer 24 with the coupling layer 25.

Otherwise, the upper shield layer 51 may be integrated with the auxiliary magnetic pole layer 21 in FIG. 1 so that one magnetic layer functions as the upper shield layer 51 and auxiliary magnetic pole layer 21.

It is also possible to mount only the perpendicular magnetic recording head Hb on the trailing side end face 11b of the slider 11 for perpendicular magnetic recording without providing the read part Hr.

Figure 19:
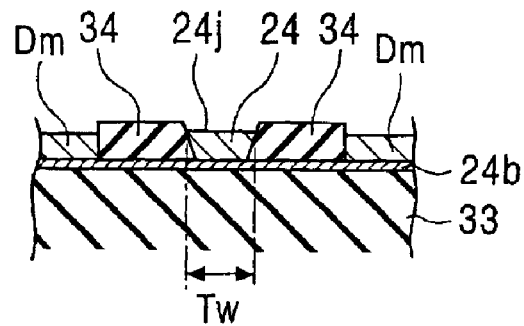
FIG. 19 is another transverse cross-sectional view of the perpendicular magnetic recording head provided for describing the manufacturing steps of the perpendicular magnetic recording head.

In another method, the plated surface 24j of the main magnetic pole layer 24 is planarized in the step shown in FIG. 19, and the plating underlayer 24b is not removed after removing the dummy plating layer Dm, so that the plating underlayer 24b is used for the plating underlayer for firming the yoke layer 36.

Figure 33:
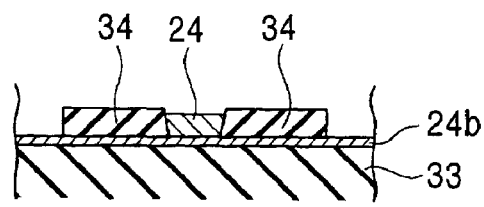
FIG. 33 is a transverse cross-sectional view of the perpendicular magnetic recording head provided for describing the manufacturing steps of the perpendicular magnetic recording head.

FIG. 33 is a transverse cross-section showing the structure after removing the dummy plating layer Dm by planarizing the surface 24j of the main magnetic pole layer 24.

Figure 34:
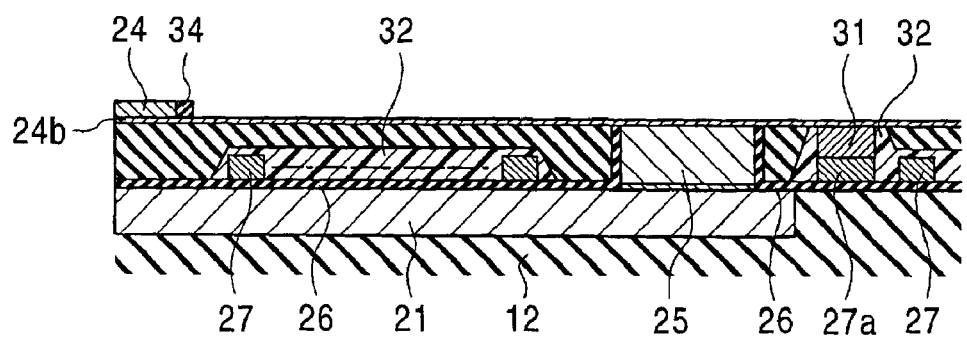
FIG. 34 is a longitudinal cross-sectional view of the perpendicular magnetic recording head provided for describing the manufacturing steps of the perpendicular magnetic recording head.

FIG. 34 is a longitudinal cross section of the perpendicular magnetic recording head after completing the step shown in FIG. 33. The cross-sectional configuration of the main magnetic pole layer 24 is an approximately inverted trapezoid in the perpendicular magnetic recording head shown in FIG. 34.

The plating underlayer 24b used for forming the main magnetic pole layer 24 by plating is also formed on the surface 25a of the coupling layer 25 and on the surface 31a of the pick-up layer 31.

Figure 35:
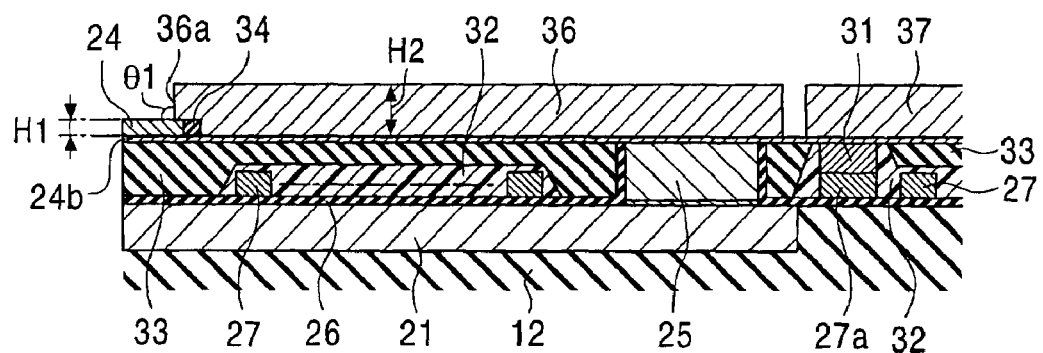
FIG. 35 is another longitudinal cross-sectional view of the perpendicular magnetic recording head provided for describing the manufacturing steps of the perpendicular magnetic recording head.
Figure 36:
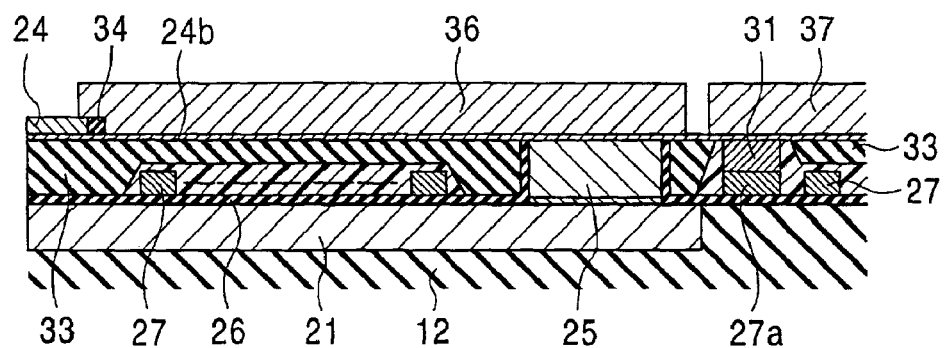
FIG. 36 is a different longitudinal cross-sectional view of the perpendicular magnetic recording head provided for describing the manufacturing steps of the perpendicular magnetic recording head.

In the next step as shown in FIG. 35, the magnetically coupled yoke layer 36 is plated on the main magnetic pole layer 24 and coupling layer 25 using the plating underlayer 24b. The width of the yoke layer 36 in the track width direction is made to be larger than the width of the main magnetic pole layer 24 at the position where the yoke layer overlaps the main magnetic pole layer 24.

The film thickness H2 of the yoke layer 36 is larger than the film thickness H1 of the main magnetic pole layer 24 in this embodiment.

Accordingly, the cross-sectional area of the main magnetic pole layer 24 is smaller than the cross-sectional area of the yoke layer 36 on the cross section parallel to the opposing face to the recording medium.

The front face 36a of the yoke layer 36 is formed to locate at the back in the height direction of the face as the opposing face.

The front face 36a of the yoke layer 36 is perpendicular to the height direction (Y-direction). However, the front face 36a of the yoke layer 36 may be inclined in the height direction from its lower face to the upper face, or the front face may be curved. The exterior angle θ1 formed between the surface of the main magnetic pole layer 24 formed under the yoke layer 36 and the front face 36a of the yoke layer 36 is preferably 90° or more. This angle permits the leakage magnetic field from the main magnetic pole layer 24 to the yoke layer 36 to be reduced, thereby allowing more magnetic field to be converged on the main magnetic pole layer 24.

The main magnetic pole layer 24 is preferably formed of a magnetic material having a higher saturation magnetic flux density Bs than the yoke layer 36.

Then, the lead layer 37 to be electrically connected to the pick-up layer 31 is plated on the pick-up layer 31 using a conductive material such as Cu, and excess plating underlayers 24b around the yoke layer 36 and lead layer 37 are removed by ion milling in order to insulate the yoke layer 36 from the lead layer 37.

Since the plating underlayer 24b is formed using a nonmagnetic material such as Cu, Au, Pd, Rh, Ru, Pt, NiLu, NiPt, NiPd, NiW, NiB, NiMo, Ir, NiCu, NiCr, Cr, and Ti in this embodiment, the pattern of the recording track on the recording medium is prevented from being disturbed even when the plating underlayer remains in the vicinity of the main magnetic pole layer 24. This means that the plating underlayer may be removed to an extent that enables the yoke layer 36 from being electrically insulated from the lead layer 37.

It is also possible to form the lead layer 37 at the same time for forming the yoke layer 36 using a magnetic material.

The protective layer 13 is formed as shown in FIG. 1 in the next step. The front face 21b of the auxiliary magnetic pole layer 21, the front face 33b of the insulation layer 33 and the front face 24a of the main magnetic pole layer 24 are exposed at the opposing face H1a by polishing the opposing face H1a, so that these faces form the same plane with each other.

The opposing face 11a of the slider 11 shown in FIG. 1 and the opposing face H1a of the perpendicular magnetic recording head Hb are covered with a abrasion resistive protective layer such as DLC mainly comprising carbon, if necessary.

For forming the planar shape of the main magnetic pole layer 24 into the shape shown in FIG. 4 or 5, the hollow pattern corresponding to the magnetic pole forming groove 40a1 of the groove 40a or the planar shape of the resist layer 41 for exposing and developing the resist layer 40 may be formed to be the same as the planar shape of the main magnetic pole layer 24 shown in FIG. 4 or 5 in the step shown in FIG. 11 or 15.

The shape of the front face of the yoke layer 36 may be the same as the shape shown in FIG. 3, 4 or 5, and the yoke layer 36 overlaps the main magnetic pole layer 24 at the position shown in FIGS. 4 and 5.

EXAMPLE

Figure 37:
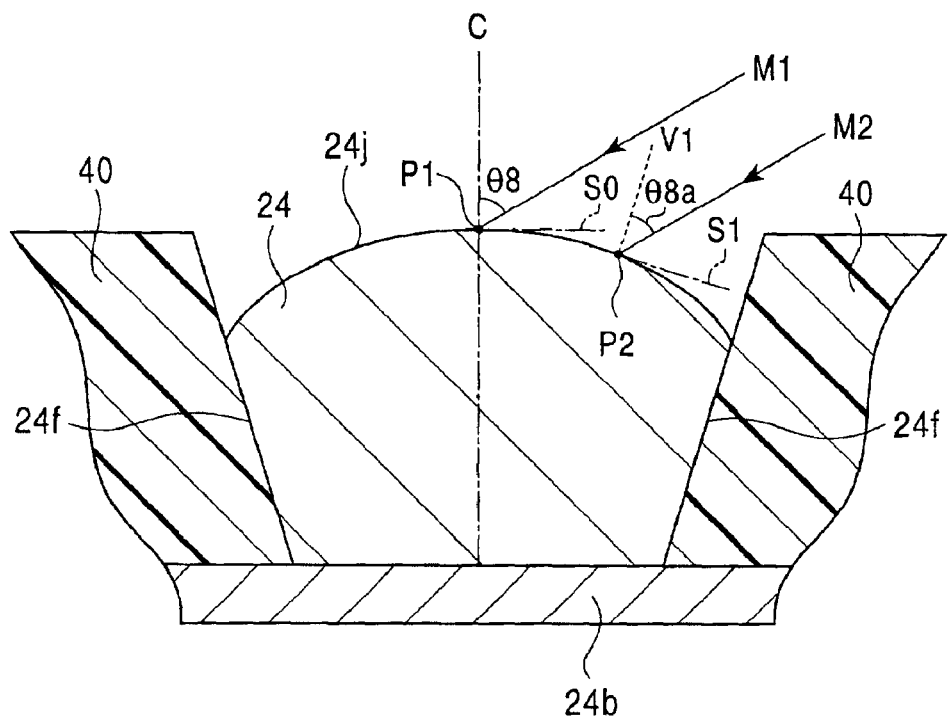
FIG. 37 is a transverse cross-sectional view of the main magnetic pole layer undergoing ion-milling processing.

FIG. 37 shows a fragmentary cross section in the vicinity of the perpendicular magnetic recording head in the step shown in FIG. 18 or 22 in the embodiment of the foregoing manufacturing method according to the present invention.

An anisotropic ion-milling process is applied by irradiating milling particles from a direction inclined by a given angle θ8 (or θ9) relative to the center line C in the longitudinal direction of the main magnetic pole layer 24 from the upward shown in FIG. 37.

Figure 38:
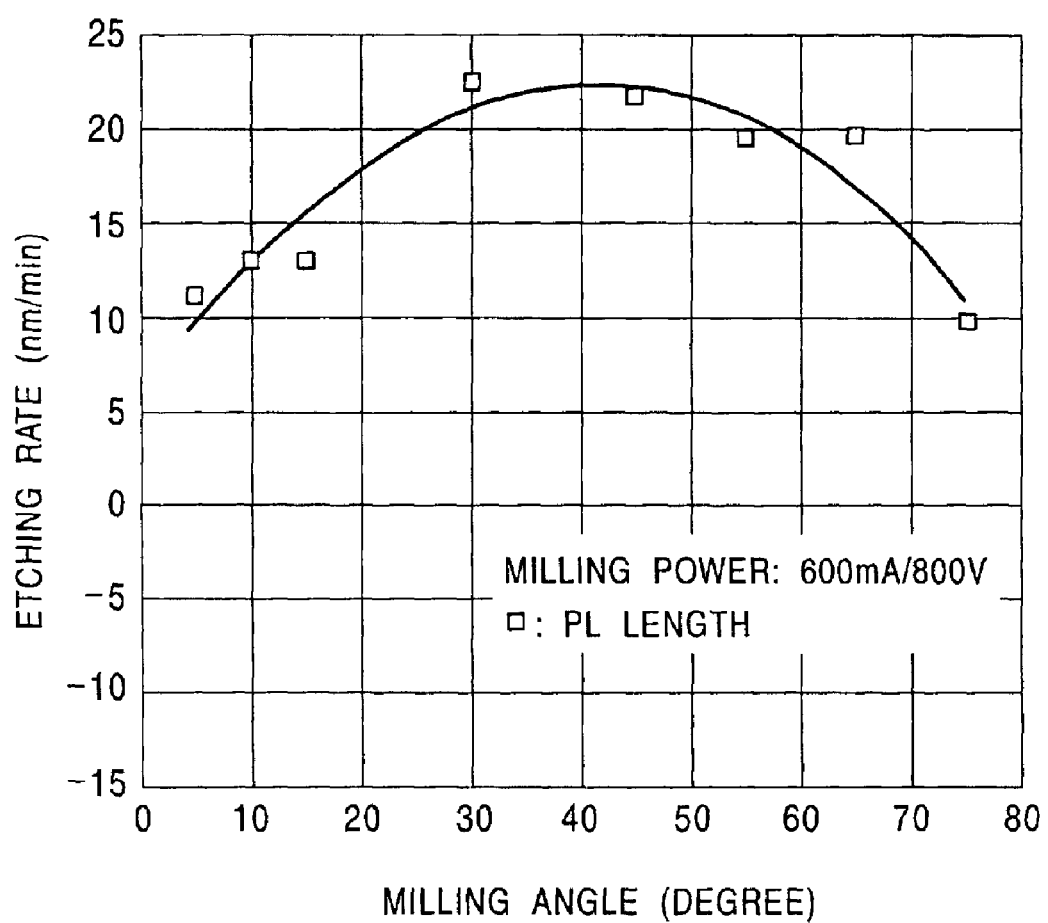
FIG. 38 is a graph showing the relation between the ion milling angle and etching rate.

FIG. 38 is a graph showing the relation between the milling angle relative to the center line C in the longitudinal direction of the main magnetic pole layer 24 and etching rate.

The curve represented by a mark □ in the graph shows the etching rate in the height direction (the Y-direction in FIG. 37) of the main magnetic pole layer 24. The etching rate in the height direction of the main magnetic pole layer 24 depends on the milling angle relative to the center line C. The graph shows that the etching rate is the largest when the milling angle is about 40 degree. The etching rate is reduced as the milling angle is reduced from 40 degree, or increased from 40 degree. The rate of change of the etching rate relative to the change of the milling angle is the largest when the milling angle is about 70 degree.

Since the surface 24j of the main magnetic pole layer 24 is swelled to form a curved surface near the center, as shown in FIG. 37, the angle formed between the normal of tangent plane at each point on the surface 24j and the irradiation direction of the milling particles are different depending on the points on the surface, when anisotropic milling particles are irradiated from a direction inclined by a given angle θ8 relative to the center line C.

For example, the angle formed between the normal (the center line C) of tangent plane S0 at the point P1 and the irradiation direction of the milling particles M1 is represented by θ8 in FIG. 37. When the angle formed between the normal V1 of the tangent plane S1 at the point P2 and the irradiation direction of the milling particles M2 is represented by θ8a, θ8 is not equal to θ8a. Accordingly, a difference is caused between the milling rates at respective points on the surface 24j of the main magnetic pole layer 24.

The etching rate may be different at each point on the surface 24j, when the surface 24j of the main magnetic pole layer 24 is etched by ion-milling in the present invention. Moreover, since the distribution of the etching rate on the surface 24j varies as etching is advanced, the surface 24j of the main magnetic pole layer 24 becomes to be gently curved, and the surface 24j is finally planarized as shown in FIG. 19 or 23.

The angle θ8 is preferably 35° or more and 80° or less, more preferably 40° or more and 50° or less, in order to avoid the etching efficiency from decreasing.

The rate of change of the etching rate relative to the change of the angle θ8 can be increased when the angle θ8 is 40° or more and 50° or less, thereby the differences of the etching rate among respective points on the surface 24j are increased to enable the surface 24j to be efficiently planarized.

Figure 39:
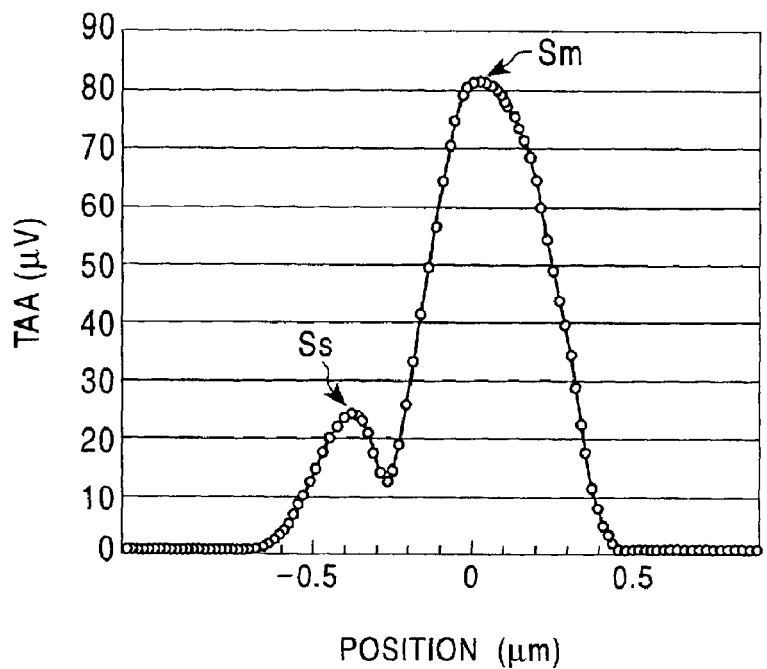
FIG. 39 shows magnetic recording characteristics of the perpendicular magnetic recording head with a plating underlayer made of a magnetic material.
Figure 40:
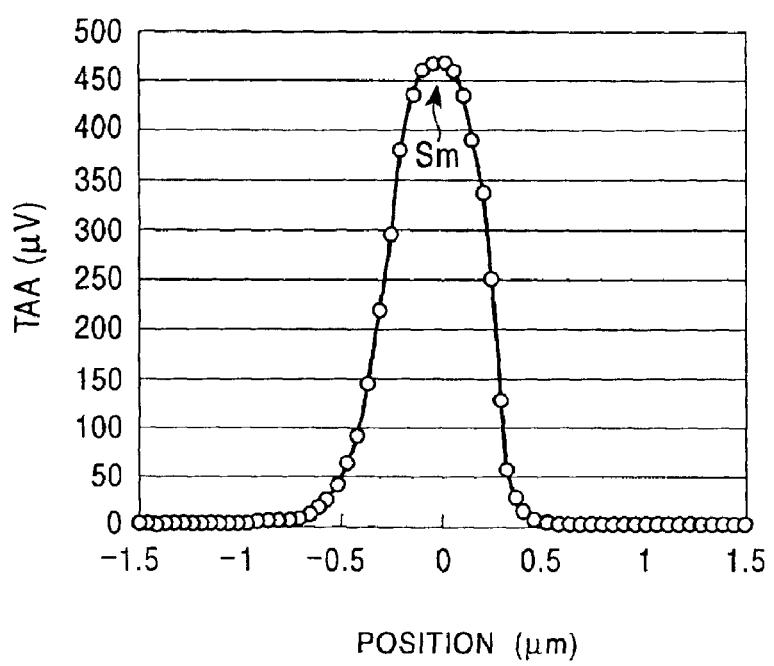
FIG. 40 shows magnetic recording characteristics of the perpendicular magnetic recording head with a plating underlayer made of a nonmagnetic material.
Figure 41:
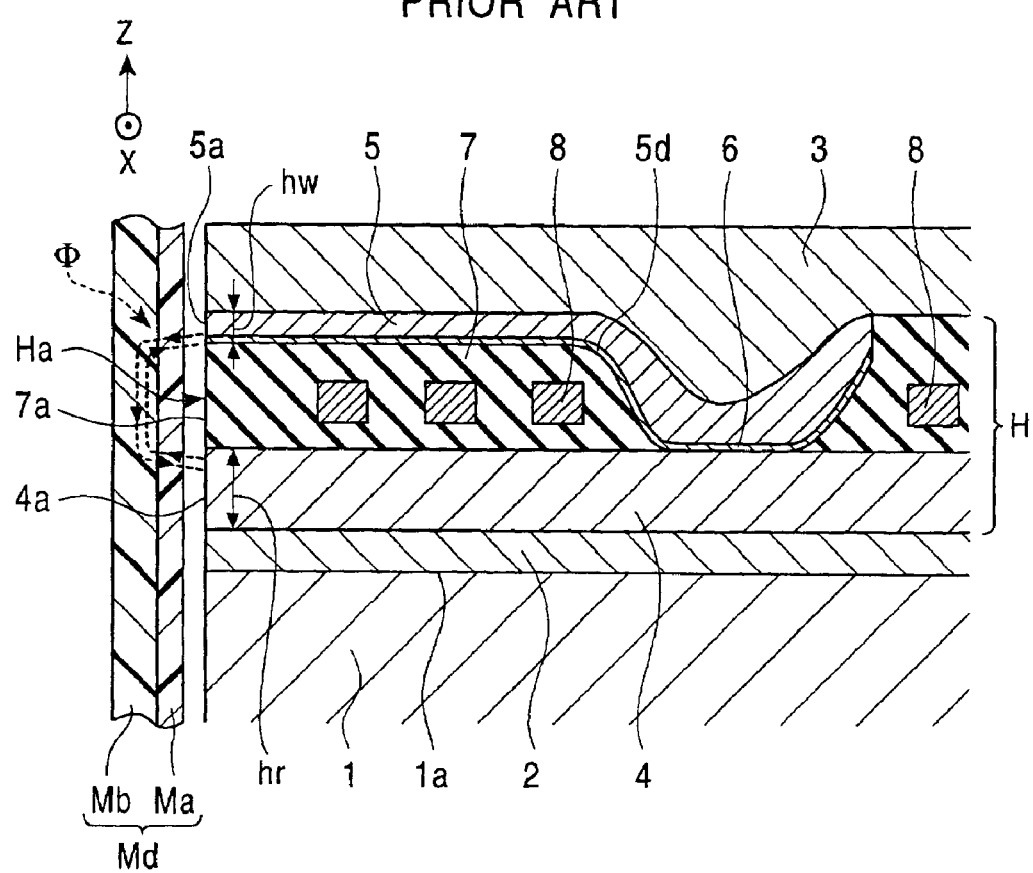
FIG. 41 is a cross-sectional view of the conventional perpendicular magnetic recording head.
Figure 42:
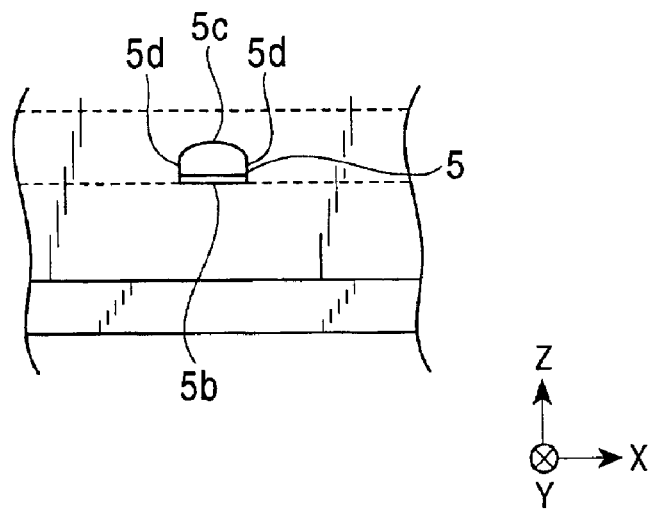
FIG. 42 is a fragmentary front view of the conventional perpendicular magnetic recording head.
Figure 43:
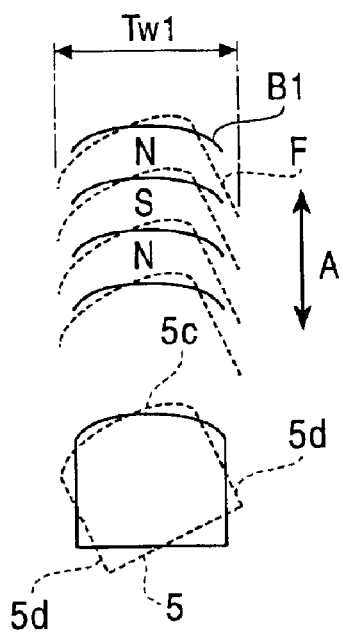
FIG. 43 is provided for describing a skew angle generated on the conventional perpendicular magnetic recording head.

FIGS. 39 and 40 are the graphs showing the changes of magnetic recording characteristics when the plating underlayer 24b is formed using a magnetic material or nonmagnetic material in the embodiment of the method for manufacturing the perpendicular magnetic recording head.

FIG. 39 shows the result of measurements of the magnetic recording characteristics of the perpendicular magnetic recording head, in which the plating underlayer 24b is formed using a magnetic material, by a micro-track profile method.

In the micro-track profile method, the distribution of recording signal intensities in the track width direction on the recording track is measured by reading the regeneration output by allowing a regeneration element such as a magnetoresistive element to scan in the track width direction on the recording track.

As shown in FIG. 39, a side signal Ss appears in addition to a main peak Sm on the recording track as shown in FIG. 39, when the plating underlayer 24b is formed using a magnetic material. This side signal Ss is written by the plating underlayer 24b in the area except for the area overlapping the main magnetic pole layer 24, and is liable to be generated when a skew angle appears in the perpendicular magnetic recording head.

FIG. 40 shows the result of measurements of the magnetic recording characteristics of the perpendicular magnetic recording head in which the plating underlayer 24b is formed using a nonmagnetic material by a micro-track profile method.

As shown in FIG. 40, only the main signal Sm appears and no side signal Ss is detected on the recording track, when the plating underlayer 24b is formed using a nonmagnetic material.

The side signal Ss is prevented from appearing on the recording medium to enable the pattern on the recording track to be prevented from being disturbed by forming the plating underlayer 24b using a nonmagnetic material, even when the side edges 24f1 and 24f1 of the main magnetic pole layer 24 are not connected to the side edges 24b1 and 24b1 of the plating underlayer 24b as a continuous straight or curved line, and when the width of the plating underlayer 24b in the track width direction is larger than the width of the bottom face 24d of the main magnetic pole layer 24 in the track width direction.

Accordingly, the perpendicular magnetic recording head may readily become compatible with high density recording by forming the plating underlayer 24b with a nonmagnetic material.

According to the present invention as hitherto described in detail, a groove having an inner width in the track width direction that gradually increases with respect to the distance from the auxiliary magnetic pole layer and having a given depth from the opposing face to the back of the opposing face is formed on the inorganic insulation layer, and the main magnetic pole layer is formed in the groove.

The shape of the front face of the main magnetic pole layer is an approximately inverted trapezoid on the opposing face to the perpendicular magnetic recording head obtained.

The inverted trapezoid shape of the front face of the main magnetic pole layer on the opposing face can prevent side edges from protruding out of the recording track, even when the side edges of the main magnetic pole layer are inclined against the tangent of the travel direction of the recording medium with a skew angle during recording on the recording medium, thereby enabling fringing to be prevented to improve off-track performance.

The upper edge of the main magnetic pole layer is able to be straight on the opposing face in the present invention by planarizing the surface of the main magnetic pole layer.

The straight line configuration of the upper edge of the main magnetic pole layer permits the magnetic domain boundary of the recording track to be a straight line, enabling a clear distribution of the recording magnetic field to be obtained even when the recording density in the recording track width direction (A-direction) is increased, thereby enabling to afford good recording and regeneration characteristics.

What is claimed is:

1. A method for manufacturing a perpendicular magnetic recording head comprising the steps of:
    (a) forming an auxiliary magnetic pole layer using a magnetic material;
    (b) forming a coupling layer with a magnetic material on the auxiliary magnetic pole layer behind a face that serves as a face opposing a recording medium;
    (c) forming a coil layer in the region behind the face that serves as the face opposing the recording medium;
    (d) laminating an insulation layer on the auxiliary magnetic pole layer;
    (e) forming an inorganic insulation layer having a main magnetic pole forming groove on the insulation layer, an inner width of the groove in a track width direction gradually increasing in accordance with the distance from the auxiliary magnetic pole layer on the recording medium opposing face, and the main magnetic pole forming groove having a given depth from the recording medium opposing face to a back of the insulation layer;
    (f) forming a main magnetic pole layer in the main magnetic pole forming groove; and
    (g) magnetically coupling the main magnetic pole layer and the coupling layer or by forming yoke layers on the main magnetic pole layer and coupling layer.

2. A method for manufacturing a perpendicular magnetic recording head according to claim 1, wherein the step (e) further comprises the steps of:
    laminating a lift-off resist layer on the insulation layer;
    depositing the inorganic insulation layer into a cut portion formed on a lower face of the resist layer using the lift-off resist layer as a mask from a perpendicular direction relative to the surface of the insulation layer or from a direction with a given angle relative to the perpendicular direction; and
    forming the inorganic insulation layer having the main magnetic pole forming groove by removing the resist layer, the inner width of the groove in the track width direction gradually increasing in accordance with the distance from the auxiliary magnetic pole layer, and the groove having the given depth from the recording medium opposing face to the back of the insulation layer.

3. A method for manufacturing a perpendicular magnetic recording head according to claim 1, wherein the step (e) further comprises the steps of:
    sequentially depositing the inorganic insulation layer on the insulation layer;
    forming, on the inorganic insulation layer, a resist layer having an etching groove with side faces inclined relative to the track width direction by heat-treating the resist layer or by adjusting a pattern forming accuracy of the groove after forming the resist layer having a patterned groove; and
    forming the main magnetic pole layer forming groove on the inorganic insulation layer by engraving the inorganic insulation layer by etching using the resist layer as a mask, the inner width of the groove in the track width direction gradually increasing in accordance with the distance from the auxiliary magnetic pole layer, and the groove having a given depth from the recording medium opposing face to the back of the insulation layer.

4. A method for manufacturing a perpendicular magnetic recording head according to claim 1, wherein the step (e) further comprises the steps of:
    sequentially depositing the inorganic insulation layer on the insulation layer; and
    forming the main magnetic pole forming groove on the inorganic insulation layer by engraving the inorganic insulation layer by etching using a resist layer as a mask after forming, on the inorganic insulation layer, the resist layer having a patterned etching groove with side faces that are perpendicular to or inclined relative to the track width direction, the inner width of the groove in the track width direction gradually increasing in accordance with the distance from the auxiliary magnetic pole layer, and the groove having a given depth from the recording medium opposing face to the back of the insulation layer.

5. A method for manufacturing a perpendicular magnetic recording head according to claim 1, wherein the step (f) further comprises the step of forming the main magnetic pole layer by a film deposition process of sputtering or vacuum deposition.

6. A method for manufacturing a perpendicular magnetic recording head according to claim 5 comprising the step of forming the main magnetic pole layer by masking the surface areas of the insulation layer and inorganic insulation layer except the main magnetic pole forming groove after forming the main magnetic pole forming groove, and embedding a magnetic material within the main magnetic pole forming groove by a film deposition process followed by removing a resist layer.

7. A method for manufacturing a perpendicular magnetic recording head according to claim 1, wherein the step (e) further comprises the steps of depositing the inorganic insulation layer on the insulation layer with a plating underlayer therebetween, followed by forming the main magnetic pole forming groove so as to expose the plating underlayer, and the step (f) further comprises the step of forming the main magnetic pole layer by plating.

8. A method for manufacturing a perpendicular magnetic recording head according to claim 7 further comprising, between the steps (f) and (g), the step (h) of planarizing the surface of the main magnetic pole layer by milling by which milling particles are projected from a direction inclined by a given angle relative to a center line of the main magnetic pole layer.

9. A method for manufacturing a perpendicular magnetic recording head according to claim 8, wherein the step (h) further comprises the step of adjusting the given angle to 35° or more and 80° or less.

10. A method for manufacturing a perpendicular magnetic recording head according to claim 8, wherein the step (h) further comprises the step of adjusting the given angle to 40° or more and 50° or less.

11. A method for manufacturing a perpendicular magnetic recording head according to claim 7, wherein the step (h) further comprises the step of forming the plating underlayer using a nonmagnetic material.

12. A method for manufacturing a perpendicular magnetic recording head according to claim 11 further comprising, at the same time as or after the step (h), the step (i) of removing the plating underlayer by milling by which milling particles are projected from a direction inclined by a given angle relative to a center line of the main magnetic pole layer except alower layer of the inorganic insulation layer on which the main magnetic pole forming groove has been formed.

* * * * *

UNITED STATES PATENT AND TRADEMARK OFFICE
CERTIFICATE OF CORRECTION

PATENT NO.    : 6,952,867 B2
DATED         : October 11, 2005
INVENTOR(S)   : Kiyoshi Sato It is certified that error appears in the above-identified patent and that said Letters Patent is hereby corrected as shown below:

<u>Column 26,</u>
Line 7, before "layer of the inorganic" delete "alower" and substitute -- a lower --.

Signed and Sealed this

Twenty-seventh Day of June, 2006

JON W. DUDAS
*Director of the United States Patent and Trademark Office*